(12) United States Patent
Gardiner

(10) Patent No.: US 10,556,812 B2
(45) Date of Patent: Feb. 11, 2020

(54) SYSTEM AND METHOD FOR REDUCING THE DISSOLVED SOLIDS OF A NON-POTABLE AQUEOUS FLOW

(71) Applicant: Jack C. Gardiner, Houston, TX (US)

(72) Inventor: Jack C. Gardiner, Houston, TX (US)

(*) Notice: Subject to any disclaimer, the term of this patent is extended or adjusted under 35 U.S.C. 154(b) by 0 days.

(21) Appl. No.: 15/861,420

(22) Filed: Jan. 3, 2018

(65) Prior Publication Data

US 2018/0186666 A1 Jul. 5, 2018

Related U.S. Application Data

(60) Provisional application No. 62/441,903, filed on Jan. 3, 2017.

(51) Int. Cl.
*C02F 1/469* (2006.01)
*B01D 63/06* (2006.01)
(Continued)

(52) U.S. Cl.
CPC .......... *C02F 1/4691* (2013.01); *B01D 61/42* (2013.01); *B01D 61/46* (2013.01); *B01D 63/06* (2013.01);
(Continued)

(58) Field of Classification Search
CPC ............... C02F 1/4691; C02F 2201/46; C02F 2103/08; B01D 61/42; B01D 61/46;
(Continued)

(56) References Cited

U.S. PATENT DOCUMENTS 5,425,858 A 6/1995 Farmer
9,061,251 B2 6/2015 Hobbs et al.
(Continued)

FOREIGN PATENT DOCUMENTS

KR 10-2015-0002364 1/2015
KR 10-2016-0136266 11/2016

OTHER PUBLICATIONS

ISA/KR—PCT/US2018/012248—counterpart PCT application—International Search Report, Written Opinion and transmittal notification dated Apr. 26, 2018, eleven pages.
(Continued)

*Primary Examiner* — Arun S Phasge
(74) *Attorney, Agent, or Firm* — Gordon G. Waggett, P.C.

(57) ABSTRACT

The present disclosure describes a flow-electrode capacitive deionization (FCDI) desalination system and method of use. The system employs clusters of tubular membranes oriented parallel to each other, each membrane having an internal flow path capable of receiving an electrolyte slurry (carbon slurry) therethrough. Each tubular membrane further comprises an electrode coaxially extending through the entire length of the electrode. Preferably, adjacent electrodes within the cluster receive a positive or negative charge, respectively. The cluster of tubular membranes is nested within a flow chamber capable of receiving saline or brackish water to be flowed along the outside surfaces of the tubular membranes to cause selected ions, e.g., Na+, Cl— to pass through the membranes and into the carbon slurry circuit. The desalinated water then passes out of the flow chamber. The outer diameter of the electrodes can be optimized based on the inner diameter of the tubular membrane.

20 Claims, 17 Drawing Sheets

(51) Int. Cl.
  *B01D 61/46* (2006.01)
  *B01D 61/42* (2006.01)
  *B01D 71/12* (2006.01)
  *B01D 71/36* (2006.01)
  *C02F 103/08* (2006.01)
(52) U.S. Cl.
  CPC .............. *B01D 71/12* (2013.01); *B01D 71/36* (2013.01); *B01D 2319/04* (2013.01); *C02F 2103/08* (2013.01); *C02F 2201/46* (2013.01); *Y02A 20/131* (2018.01); *Y02A 20/134* (2018.01)
(58) Field of Classification Search
  CPC .... B01D 63/06; B01D 2319/04; B01D 71/36; B01D 71/12; Y02A 20/134
  See application file for complete search history.

(56) References Cited

U.S. PATENT DOCUMENTS

| | | | |
|---|---|---|---|
| 2008/0198531 A1* | 8/2008 | Shiue | C02F 1/46104 361/434 |
| 2011/0281169 A1 | 11/2011 | Zheng et al. | |
| 2012/0247959 A1 | 10/2012 | Seed et al. | |
| 2012/0273359 A1 | 11/2012 | Suss et al. | |
| 2014/0027288 A1 | 1/2014 | Nyberg et al. | |
| 2016/0185628 A1 | 6/2016 | Servida | |
| 2016/0289097 A1* | 10/2016 | Jeong | C02F 1/4691 |

OTHER PUBLICATIONS

Anderson, M.A.; Cudero, A.L.; and Palma, J., "Capacitive deionization as an electrochemical means of saving energy and delivering clean water. Comparison to present desalination practices: Will it compete?", Electrochimica Acta, (Feb. 12, 2010), 55(12), pp. 3845-3856 (Abstract Only).
Biesheuvel, P.M., "Thermodynamic cycle analysis for capacitive deionization", Journal of Colloid and Interface Science, (Jan. 22, 2009), 332(1), pp. 258-264 (Abstract Only).
Biesheuvel, P.M.; Zhao, R.; Porada, S., Van Der Wal, A.; "Theory of membrane capacitive deionization including the effect of the electrode pore space", J. Colloid and Interface Sci., (Apr. 24, 2011), 360(1), pp. 239-248 (Abstract Only).
Campos, J.W.; Beidaghi, M.; Hatzell, K.B.; Dennison, C.R.; Musci, B.; Presser, V.; Kumbur, E.C. and Gogotsi, Y., "Investigation of carbon Materials for use as a flow able electrode in electrochemical flow capacitors", Electrochimica Acta, (Mar. 15, 2012), 98, pp. 123-130 (Abstract Only).
Dennison, C.R.; Beidaghi, M.; Hatzell, K.B.; Campos, J.W.; Gogotsi, Y.; Kumbur, E.C., "Effects of Flow Cell Design on Charge percolation and storage in the carbon slurry electrodes of electrochemical flow capacitors", J. Power Sources, (Sep. 3, 2013), 247, pp. 489-496 (Abstract Only).
Hatzell, K.B.; Beidaghi, M.; Campos, J.W.; Dennison, C.R.; Kumbur, E.C.; and Gogotsi, Y., "A High Performance Pseudo capacitive capacitor: a new concept for rapid energy storage and recovery." Electrochimica Acta, (Aug. 30, 2013), 111, pp. 888-897.
Jeon, Sung-Il; Park, Hong-Ran; Yeo, Jeong-Gu; Yang, Seungcheol; Cho, Churl Hee; Han, Moon Hee; and Kim, Dong Kook, "Desalination via a new membrane capacitive deionization process utilizing flow-electrodes", Energy Environ. Sci., (Mar. 4, 2013), 6, pp. 1471-1475.
Kim, S.J.; Ko, S.H.; Kang, K.H., and Han, J., "Direct seawater desalination by ion concentration polarization", Nature Nanotechnology, (Mar. 21, 2010), 5, pp. 297-302 (Abstract Only).
Kim, Y.J.; and Choi, J.H.; "Improvement of desalination efficiency in capacitive deionization using a carbon electrode coated with an ion-exchange polymer", Water Research, (Jan. 2010), 44(3), pp. 990-996 (Abstract Only).

Kondrat, S.; Perez, C.R.; Presser, V.; Gogotsi, Y.; Kornyshev, A.A., "Effect of pore size and its dispersity on the energy storage in nanoporous supercapacitors", Energy and Environ. Sci., (Mar. 2012), 5(4), pp. 6474-6479 (Abstract Only).
Leonard K.C.; Genthe J.R.; Sanfilippo, J.L.; Zeltner, W.A.; and Anderson, M.A.; "Synthesis and Characterization of Asymmetric Electrochemical Capacitive Deionization Materials Using Nanoporous Silicon Dioxide and Magnesium Doped Aluminum Oxide", Electrochimica Acta, (Aug. 2009), 54(22), pp. 5286-5291 (Abstract Only).
Lee, J.H.; Bae, W.S.; and Choi, J.H.; "Electrode reactions and adsorption/desorption performance related to the applied potential in a capacitive deionization process", Desalination, (Apr. 10, 2010), 258, pp. 159-163.
Lee, J.B.; Park, K.K.; Eum, H.M.; Lee, C.W.; "Desalination of a thermal power plant wastewater by membrane capacitive deionization", Desalination, (Aug. 28, 2006), 196, pp. 125-134 (Abstract Only).
Li, H.; Gao, Y.; Pan, L., Zhang, Y., Chen, Y.; and Sun, Z., "Electrosorptive desalination by carbon nanotubes and nanofibres electrodes and ion-exchange membranes", Water Research, (Oct. 2, 2008), 42, pp. 4923-4928 (Abstract Only).
Li, H.; Zou, L.D.; Pan, L.K.; and Sun, Z.; "Novel graphene-like electrodes for capacitive deionization", Environ. Sci. Technol., (Oct. 21, 2010), 44(22), pp. 8692-8697 (Abstract Only).
Li, H.; and Zou, L.; "Ion-exchange membrane capacitive deionization: A new strategy for brackish water desalination", Desalination, (May 14, 2011), 275(1-3), pp. 62-66 (Abstract Only).
Pasta, M.; Wessells, C.D.; Cui, Y.; La Mantia, F.; "A Desalination Battery", Nano Letters, (Jan. 23, 2012), 12, pp. 839-843.
Porada, S.; Borchardt, L.; Oschatz, M.; Bryjak, M.; Atchison, J.S.; Keesman, K.J.; Kaskel, S.; Biesheuvel, P.M.; and Presser, V.; "Direct prediction of the desalination performance of porous carbon electrodes for capacitive deionization", Energy Environ. Sci., (Aug. 14, 2013), 6, pp. 3700-3712.
Porada, S.; Zhao, R.; Van Der Wal, A.; Presser, V., and Biesheuvel, P.M.; "Review on the science and technology of water desalination by capacitive deionization", Progress in Materials Science, (Apr. 4, 2013), 58, pp. 1388-1442.
Presser, V.; Dennison, C.R.; Campos, J.; Knehr, K.W.; Kumbur, E.C.; and Gogotsi, Y., "The Electrochemical Flow Capacitor: A new Concept for rapid energy storage and recovery", Advanced Energy Materials (May 23, 2012), 2(7), pp. 895-902 (Abstract Only).
Rommerrskirchen, A.; Gendel, Y.; and Wessling, M., "Single Module Flow-Electrode Capacitive deionization for Continuous Water desalination", Electrochem. Comm., (Jul. 29, 2015), 60, pp. 34-37 (Abstract Only).
Simon, P. and Gogotsi, Y., "Materials for electrochemical capacitors", Nature Materials, (Dec. 2008), 7(11), pp. 845-854.
Suss, M.E.; Porada, S.; Sun, X.; Biesheuvel, P.M.; Yoon, J.; Presser, V.; "Water desalination via capacitive deionization: what is it and what can we expect from it?", Energy and Environ. Sci., (May 5, 2015), 8, pp. 2296-2319.
Unda, J.E.Z. and Roduner, E., "Reversible transient hydrogen storage in a fuel cell-supercapacitor hybrid device", Phys. Chem. Chem. Phys. (Feb. 2012), 14(11), pp. 3816-3824 (Abstract Only).
Weinstein, L. and Dash, R., "Capacitive Deionization: Challenges and Opportunities", Desalination & Water Reuse, (Nov.-Dec. 2013), pp. 34-37.
Yang, Seungcheol; Choi, Jiyeon; Yeo, Jeong-Gu; Jeon, Sung-Il; Park, Hong-Ran; and Kim, Dong KooK, "Flow-electrode Capacitive Deionization Using an Aqueous Electrolyte with a High Salt Concentration." Environ. Sci. Technol., May 10, 2016, 50(11), pp. 5892-5899 (Abstract Only).
Yang, Seungcheol; Jeon, Sung-Il; Kim, Hanki; Choi, Jiyeon; Yeo, Jeong-Gu; Park, Hong-Ran; and Kim, Dong Kook, "Stack design and operation for scaling up the capacity of flow-electrode capacitive deionization technology", ACS Sustainable Chem. Eng., (Jun. 20, 2016), 4(8), pp. 4174-4180 (Abstract Only).
Yuan, L.; Yang, X.; Liang, P.; Wang, L.; Huang, Z.H.; Wei, J.; and Huang, X., "Capacitive deionization coupled with microbial fuel cells to desalinate low concentration salt water", Bioresource Technology, (Feb. 2, 2012), 110, pp. 735-738.

(56) References Cited

OTHER PUBLICATIONS

Zhao, R.; Biesheuvel, P.M.; Miedema, H.; Brunning, H.; Van Der Wal, A.; "Charge efficiency: A functional tool to probe the double-layer structure inside of porous electrodes and application in the modeling of capacitive deionization", The Journal of Physical Chemistry Letters, (Nov. 16, 2009), 1, 205-210 (Abstract Only).

Zou, L.; Li, L.; Song, H.; and Morris, G., "Using mesoporous carbon electrodes for brackish water desalination", Water Res., (Jan. 4, 2008), 42(8-9), pp. 2340-2348 (Abstract Only).

Hatzell, K.B.; Hatzell, M.C.; Cook, K.M.; Boota, M.; House, G.M.; McBride, A.; Kumbur, E.C.; and Gogotsi, Y., "Effect of Oxidation of Carbon Material on Suspension Electrodes for Flow Electrode Capacitive Deionization", Environ. Sci. Technol., (Jan. 29, 2015), 49(5), pp. 3040-3047.

Lawrence Livermore National Laboratory, "Flow-Through Electrode Capacitive Desalinization", ipo.llnl.gov/technologies/fte_cd, Oct. 2014 https://ipo.llnl.gov/technologies/energy., 2 pages.

Wikipedia, "Capacitive Deionization", en./wikipedia.org/wiki/Capacitive_deionization, page last modified Nov. 27, 2016, 9 pages.

CDI & Electrosorption, "CDI & Electrosorption", www.cdi-electrosorption.org/ (last accessed Dec. 1, 2016), 3 pages.

Spectrumlabs.com, "Biotech Cellulose Ester (CE) Membrane", website screenshots last accessed Dec. 1, 2016, 2 pages.

\* cited by examiner

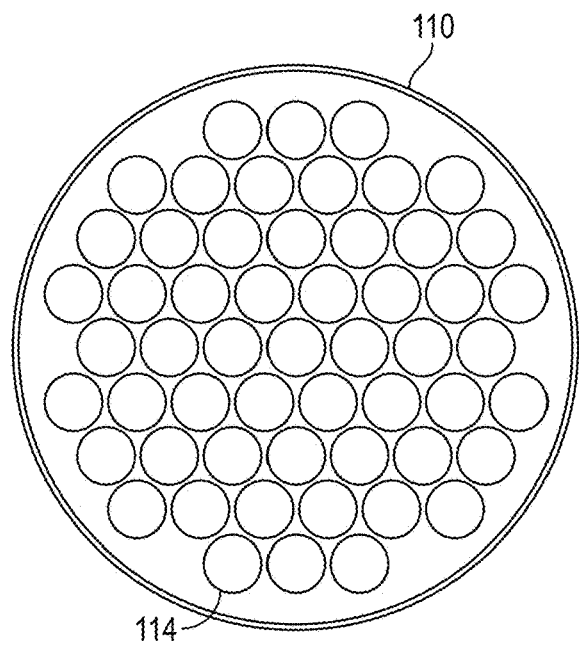
FIG. 13A
(Prior Art)
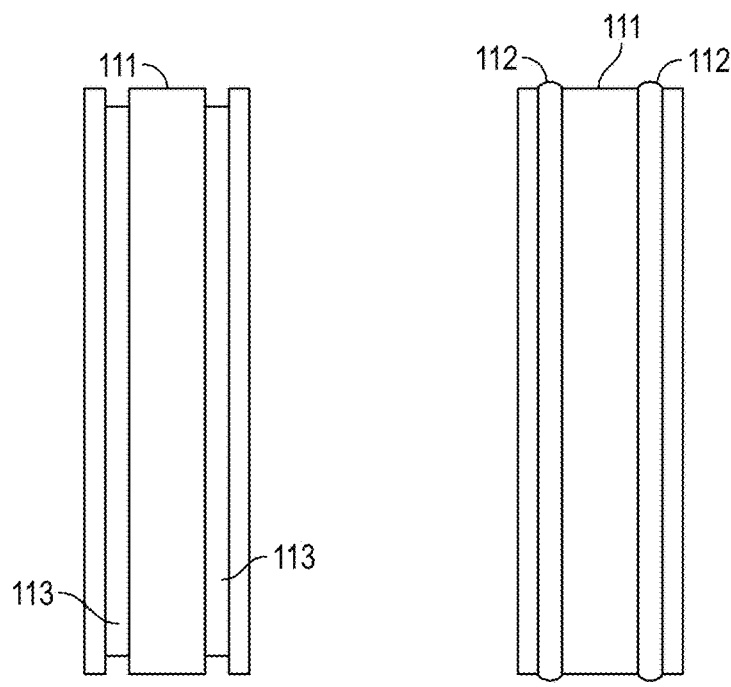
FIG. 13B
(Prior Art)
FIG. 13C
(Prior Art)

SYSTEM AND METHOD FOR REDUCING THE DISSOLVED SOLIDS OF A NON-POTABLE AQUEOUS FLOW

CROSS-REFERENCE TO RELATED APPLICATIONS

This application claims the benefit of the filing date of and priority to: U.S. Provisional Application Ser. No. 62/441,903 entitled "System and Method for Reducing the Dissolved Solids of a Non-Potable Aqueous Flow" and filed Jan. 3, 2017, Confirmation No. 1512; said provisional application being incorporated by reference herein in its entirety for all purposes.

COPYRIGHT AUTHORIZATION UNDER 37 CFR 1.71

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

STATEMENT REGARDING FEDERALLY SPONSORED RESEARCH OR DEVELOPMENT

Not Applicable.

BACKGROUND OF THE INVENTION

Field of the Invention

The present disclosure relates generally to the field of water desalination, and more particularly to the use of flow-electrode capacitive deionization (FCDI) technology in the desalination of water. The present disclosure relates more specifically to a system, and method for reducing the dissolved solids of a non-potable aqueous flow.

Desalination refers to any of several processes that remove the excess salt and other minerals from water in order to obtain fresh water suitable for animal consumption or irrigation, and if almost all of the salt is removed, for human consumption, sometimes producing table salt as a by-product.

The traditional process used in these operations is distillation—essentially the boiling of water at less than atmospheric pressure, and thus a much lower temperature than normal. Due to the reduced temperature, energy is saved.

In the last decade, membrane processes have grown very fast, and Reverse Osmosis (RO) has taken nearly half the world's installed capacity.

Membrane processes use semi-permeable membranes to filter out dissolved material or fine solids.

The systems are usually driven by high-pressure pumps, but the growth of more efficient energy-recovery devices has reduced the power consumption of these plants and made them much more viable; however, they remain energy intensive and, as energy costs rise, so will the cost of RO water.

Increasing global water demand for fresh water because of rising population, increasing standard of living, and expanding agriculture and industrialization is driving the development of new and energy efficient water desalination technologies. Such technologies include: capacitive deionization (CDI) (see, e.g., L. Zou et al., "Using mesoporous carbon electrodes for brackish water desalination", *Water Research* 2008, 42, 2340; K. C. Leonard et al., "Synthesis and characterization of asymmetric electrochemical capacitive deionization materials using nanoporous silicon dioxide and magnesium doped aluminum oxide", *Electrochimica Acta* 2009, 54, 5286; P. M. Biesheuvel, "Thermodynamic cycle analysis for capacitive deionization", *Journal of Colloid and Interface Science,* 2009, 332, 258; R. Zhao et al., "Charge efficiency: A functional tool to probe the double-layer structure inside of porous electrodes and application in the modeling of capacitive deionization", *The Journal of Physical Chemistry* Letters 2010, 1, 205; H. Li et al., "Novel graphene-like electrodes for capacitive deionization", *Environmental Science and Technology* 2010, 44, 8692; and M. A. Anderson et al., "Capacitive deionization as an electrochemical means of saving energy and delivering clean water. Comparing to present desalination practices: Will it compete?", *Electrochimica Acta* 2010, 55, 3845); membrane capacitive deionization (MCDI)(see, e.g., J. H. Lee et al., "Electrode reactions and adsorption/desorption performance related to the applied potential in a capacitive deionization process", *Desalination* 2010, 258,159; J. B. Lee et al., "Desalination of a thermal power plant wastewater by membrane capacitive deionization", *Desalination* 2006, 196 125; H. Li et al., "Electrosorptive desalination by carbon nanotubes and nanofibres electrodes and ion-exchange membranes", *Water Research* 2008, 42 4923, P. M. Biesheuvel et al, "Membrane capacitive deionization", *Journal of Membrane Science* 2009, 346 256; Y. J. Kim et al., "Improvement of desalination efficiency in capacitive deionization using a carbon electrode coated with an ion-exchange polymer", *Water Research* 2010, 44, 990); and desalination using micro channels (see, P. M. Biesheuvel et al, "Theory of membrane capacitive deionization including the effect of the electrode pore space", *Journal of Colloid and Interface Science* 2011, 361, 239, batteries (see, e.g., H. Li et al, "Ion-exchange membrane capacitive deionization: a new strategy for brackish water desalination", *Desalination* 2011, 275, 6224) and microbial desalination cells (see, e.g., S. J. Kim et al, "Direct seawater desalination by ion concentration polarization", *Nature Nanotechnology* 2010, 5, 297). Several of these techniques are related to ongoing work on supercapacitor batteries (see, e.g., H. Li et al, "Ion-exchange membrane capacitive deionization: a new strategy for brackish water desalination", *Desalination* 2011, 275, 6224, and M. Pasta et al., "A desalination battery", *Nano Letters* 2012, 12, 839).

Background

In the last decade the art of CDI (capacitive deionization) has seen extensive attention. As suggested, seawater is passed between the plates of high surface area material such as carbon. Upon applying a "cell" voltage difference between the two plates, the one of negative polarity acts as a cathode and absorbs cations (such as Na+), with the other serving as the anode, absorbing anions (like Cl—) from the seawater. FIG. 1 provides a schematic illustration of the known desalination via the CDI process described by Porada, Zhao, et al., "Review on the science and technology of water desalination by capacitive deionization [OPEN ACCESS]". *Progress in Materials Science,* 2013, 58: 1388-1442. According to Porada, Zhao et al., FIG. 1 illustrates that that with CDI, "upon applying a voltage difference between two porous carbon electrodes, ions are attracted into the electrode, cations into the negative electrode (cathode, on top), anions into the positive electrode (anode, bottom). As a result, desalinated water is produced." This immobilization of ions decreases the salt concentration in the low channel, and results in the production of freshwater. Porada, Borchardt, et al., "Direct prediction of the desalination performance of porous carbon electrodes for capacitive deionization", *Energy Environ. Sci.,* 2013, 6, 3700.

This is a capacitive process and ions are temporarily stored in the electrical double layers (EDLs) formed within the micro pores inside the carbon particles that constitute the electrodes. Ions do not absorb (electro) chemically and do not react in any way. Faraday chemical reactions as essential in batteries or pseudo-capacitance effects, are not the driving force for ion absorption in this capacitance process. The result is an elegant desalination methodology. See, U.S. Pat. No. 5,425,858 (Farmer) entitled "Method and apparatus for capacitive deionization, electrochemical purification, and regeneration of electrodes" which is incorporated herein by reference for all purposes. Enhancements to this configuration include the use of both anionic and cationic membranes across which the respective ions pass. FIG. 2 schematically illustrates a prior art membrane capacitive deionization (MCDI) process described by Porada, Zhao, et al. who indicate that with MCDI, a cation-exchange membraned is placed in front of the cathode, while an anion-exchange membrane is placed in front of the anode. The reason that membranes might be advantageous is that without them during the desalination step in which ions of one charge sign are attracted into an electrode (the counter ions), that in this period, ions of the opposite charge sign (co-ions having the same charge in the carbon matrix) are released from the electrode, therefore degrading the desalination efficiency. The use of a membrane selective only to counter ions effectively blocks the co-ions from escaping from the electrode, which increases desalination efficiency. See. L. Weinstein et al, "Capacitive deionization: challenges and opportunities". *Desalination & Water Reuse,* November-December 2013.

With the onset of renewable energy sources, an emerging technology termed electrochemical flow capacitors has been established for Grid energy storage. Operation is based upon a flowable carbon-electrolyte that is pumped from a storage reservoir between two polarized plates (Charging Process). Once fully charged, the slurry is pumped out of the cell and stored in external reservoirs until the process is reversed and the slurry is discharged. The charged slurry stores charge electrostatically at the carbon-electrolyte interface which allows for rapid charging and discharging leading to higher power density. Faradaic charging processes have losses that cause degradation of the device over time compared to electrostatic charging, which is near 100% efficient and millions of charge discharge cycles.

Capacitive deionization (CDI) is a technology used primarily in the desalination of brackish water (low or moderate salt concentration (below 10 g/L)) by applying an electrical potential difference over two porous carbon electrodes. Anions, ions with a negative charge, are removed from the water and are stored in the positively polarized electrode. Likewise, cations (positive charge) are stored in the cathode, which is the negatively polarized electrode. Other technologies for the deionization of water are, amongst others, distillation, reverse osmosis and electrodialysis. Compared to reverse osmosis and distillation, CDI is considered to be an energy-efficient technology for brackish water desalination. This is mainly because CDI removes the salt ions from the water, while the other technologies extract the water from the salt solution. See, M. E. Suss, et al., (2015). "Water desalination via capacitive deionization: what is it and what can we expect from it? [OPEN ACCESS]". *Energy Environ. Sci.* Weinstein, Lawrence; Dash, R. (2013). "Capacitive deionization: challenges and opportunities". *Desalination & Water Reuse.* Porada, Zhao, et al. (2013). "Review on the science and technology of water desalination by capacitive deionization [OPEN ACCESS]". *Progress in Materials Science.* 58: 1388-1442. M. A. Anderson, et al., (2010). "Capacitive deionization as an electrochemical means of saving energy and delivering clean water. Comparing to present desalination practices: Will it compete?" *Electrochimica Acta.* 55 (12): 3845-3856. "CDI & electrosorption". http://www.cdi-electrosorption-.org. CDI is also referred to as electrochemical demineralization, "electrosorb process for desalination of water", electrosorption of salt ions, capacitive desalination, and "CapDI".

For CDI as applied to desalination, the above flowable carbon-electrolyte principles are directly applicable in what is termed flow-electrode capacitive deionization (FCDI or Flow CDI). As depicted in FIG. 3, a schematic illustration of an existing FCDI process is described by Jeon, et al., "Desalination via a new membrane capacitive deionization process utilizing flow-electrodes", *Energy Environ. Sci.,* 2013, 6, 1471-1475. In Jeon, et al., a capacitive deionization process utilizing flow-electrodes (FCDI) was designed and evaluated for use in seawater desalination. The FCDI cell exhibited excellent removal efficiency (95%) with respect to an aqueous NaCl solution (salt concentration: 32.1 g $L^{-1}$), demonstrating that the FCDI process could effectively overcome the limitations of typical CDI processes. The characteristics of CDI applied to the flow electrode are maintained continuously by providing fresh flow electrodes with infinite ion capacitance. See, e.g., Zou et al., "Using mesoporous carbon electrodes for brackish water desalination", *Water Research* 2008, 42, 2340-8. Rommerskirchen, et al. "Single module flow-electrode capacitive deionization for continuous water desalination" *Electrochemistry Communications.* 60 (2015) 34-37, aptly describes the advances to FCDI from CDI. According to Rommerskirchen, et al., classical CDI is a discontinuous or semi-continuous process due to the need for regeneration of the electrodes within the same module, but flow-electrodes offer new design opportunities which enable fully continuous desalination processes as well as easily scalable systems.

FCDI is a CDI technology exhibiting continuous and scalable deionization and a high desalting efficiency, but it has been reported that the electrochemical and flow properties of the flow electrode need to be improved to minimize energy consumption. Hatzell, et al. "Effect of oxidation of carbon material on suspension electrodes for flow electrode capacitive deionization." *Environ. Sci. Technol.,* 2015, 49 (5), pp 3040-3047; Yang, et al. "Flow-electrode capacitive deionization using an aqueous electrolyte with a high salt concentration." *Environ Sci Technol.* 2016 Jun. 7; 50(11): 5892-9.

Humanity continues to face an ever growing demand for renewable energy and affordable drinking water as a result of population growth and increased industrial and agricultural activity. In recent years, carbon-based materials have emerged as key components for many energy and water related technologies because of the high availability and abundance, vast structural and chemical variability, and moderate to low costs. In particular, high surface area porous carbons used for ion electro sorption have become a versatile and uncomplicated technology platform with applications ranging from highly efficient capacitive energy storage (electrical double-layer capacitors, EDLCs, also known as supercapacitors) and water treatment via capacitive deionization (CDI). Currently, all capacitive technologies employ intermittent cycling: ion electro sorption is followed by a regeneration step, and subsequent repeating of this discontinuous procedure. This operational mode has been employed in electrochemical capacitors, capacitive actuators, and CDI.

CDI until now, exclusively involve solid film electrodes integrated in an electrochemical cell that enables and facilitates electrolyte in- and out-flow. Yet, two major drawbacks are the discontinuous output, in the form of desalinated water and the extra energy expenditure since ions have to travel twice across the ion exchange membrane interface, first in order to be adsorbed, and later to be released again to the spacer channel.

In contrast, in a system based on flow electrodes, FCDI, which operates in steady-state, the separated out flow streams have constant composition (unvarying in time), while ions only transfer across the membrane once. Instead of the discharge step taking place in the same cell, the carbon flow electrode suspensions can easily be regenerated outside the cell by directly mixing the two carbon particles streams together, which results in spontaneous discharge and salt release. The discharged particles must be separated from the resulting brine (in case of desalination) and (together with a portion of the feed water) re-injected in the electrode channels. This operation can be achieved by simple particle filtration. Thus, a continuous water deionization process would have the potential to achieve higher energy efficiency, more stable system performance, and ultimately enable a simpler system design than classical designs based on film electrodes.

Flow electrodes as the key element to enable continuous operation are based on capacitive carbon slurries. A carbon slurry is a suspension of charged carbon particles in an electrolyte and was first investigated in the 1960's as a facile and robust technology to transport charge and electro-sorbed ions held in the electrical double-layer, EDL, within the carbon particle. Unique features of carbon suspensions are that flowing suspensions are still electrically conductive and that the EDL persists when the carrier particles are moved mechanically, or in our case, transported within a suspension. In fact, from a fundamental point of view, the equilibrium electro-sorption capacity of carbon materials should be identical for a flow or non-flow configuration. Having undergone a renaissance in recent years, flow electrodes have been proposed as breakthrough technologies to enable large scale energy storage and management and continuous CDI operation.

The potential of the carbon flow electrodes has recently been demonstrated for CDI where flow electrodes have been introduced in two channels, both separated from the feed water spacer channel by electrically insulating membrane material or ion exchange membranes that prevent mixing of the three streams at any time.

As the carbon flow electrode can be circulated and regenerated continuously, intrinsic ion uptake capacity per carbon mass is no longer limiting system operation because the electrode flow channel size (when setting up the system) and flow rate (during operation) can be adjusted to meet the necessary requirements set by the application.

In the current state of the art, FCDI has once again plateaued and stalled as with the classic CDI, in the elusive realization of a scaled-up practical and viable user friendly product. Most FCDI patents that are emerging use the basic building blocks with innovative variations. The core FCDI building blocks consist of grooved stationary electrodes over which the carbon slurry is intimately contacted to transfer the charge. Juxtaposed between these electrodes are anionic and cationic membranes which when spaced form the saline water channel. Scale up has been suggested by Yang et al., "Stack design and operation for scaling up the capacity of flow-electrode capacitive deionization technology." *ACS Sustainable Chemistry and Engineering*, 2016, 4 (8), pp 4174-4180. However, the complexity remains with multiples of the core building blocks and expensive vulnerable ionic sheet membranes. This stack design, with its inevitable linear geometries presents complexities, and ionic membranes inevitably deteriorate from the flow of the abrasive slurries, combining to limit the performance of the scale up.

BRIEF SUMMARY OF INVENTION

Disclosed is a new and practical scalable FCDI System for desalination of, e.g., ocean and brackish water.

In one embodiment, there is described a flow-electrode capacitive deionization (FCDI) desalination cell comprising: (a) a tubular housing having an upper end and a lower end, a first interior annular fluid flow space extending between the upper and lower ends, a feed solution inlet port proximate the lower end in fluid communication with the first interior annular space, and a treated solution outlet port proximate the upper end in fluid communication with the first interior annular space; (b) an tubular upper end cap attached to the tubular housing upper end and comprising an internal annular upper end cap space, an upper seal member sealing the upper end of the tubular housing, and an outlet port in fluid communication with the internal annular upper end cap space, the upper seal isolating the internal annular upper end cap space from the tubular housing first interior annular space; (c) an tubular lower end cap attached to the tubular housing lower end and comprising an internal annular lower end cap space, a lower seal member sealing the lower end of the tubular housing, and an inlet port in fluid communication with the internal annular lower end cap space, the lower seal isolating the internal annular lower end cap space from the tubular housing first interior annular space; (d) a plurality of tubular membranes oriented in parallel relationship to each other, each membrane having a lower end, an upper end, an outer surface and an inner tubular space therebetween, each tubular member being mounted within the cell so that its lower end is in fluid communication with the internal annular lower end cap space, so that it passes in sealed fashion through the lower seal member, so that it extends through the first annular fluid flow space, so that it passes in sealed fashion through the upper seal member, and so that its upper end is in fluid communication with the internal annular upper end cap space, each tubular member connecting the lower end cap space and the upper end cap space in fluid communication; and (e) a plurality of electrodes extended through each respective membrane inner tubular space, respectively, wherein approximately one half of the plurality of electrodes each has a positive polarity, wherein the remainder of the plurality of electrodes each has a negative polarity, and wherein the negative and positive polarity electrodes are evenly distributed through the plurality of electrodes to create a plurality of pairs of tubular membranes having opposite polarity. The annular lower end cap space is capable of receiving a carbon slurry through the lower end cap inlet. The carbon slurry is capable of moving through the inner tubular spaces of the plurality of tubular members into the annular upper end cap space and then out the upper end cap outlet. In various embodiments, the plurality of electrodes may comprise titanium wire, graphite rod wire, electrode coils, or electrode mesh. The plurality of tubular membranes may be selected from the group consisting of ultra-fine (UF) filter tubes, cellulose ester membranes, tubular ionic membranes, porous, compressible PTFE and/or fluorocopolymers.

In another embodiment, there is described a flow-electrode capacitive deionization (FCDI) desalination system comprising: (1) an FCDI desalination cell as described herein; (2) a first motive force for introducing a feed solution, to be desalinated, through the feed solution inlet port and into the cell, at a first pressure $P_1$, and for urging the feed solution to move through the first interior annular fluid flow space while contacting the outer surfaces of the plurality of tubular membranes before exiting the cell through the treated solution outlet port; (3) a source of carbon slurry; and (4) a motive force for introducing the carbon slurry into the cell annular lower end cap, at a second pressure $P_2$, through the lower end cap inlet, urging the carbon slurry to pass through the inner tubular spaces of the plurality of tubular members, into the annular upper end cap space and then out of the upper end cap outlet. The first and second motive forces may be positive forces created by a pump to push the feed solution through the cell. The first and second motive forces may also comprise a vacuum force to pull the feed solution through the cell. The FCDI desalination system may further comprise a reservoir for holding the carbon slurry, the reservoir being in fluid communication with the lower end cap inlet, the reservoir capable of separating excess saline solution from the carbon slurry.

There is also described a method of flow-electrode capacitive deionization (FCDI) desalination of brine or brackish feed water solution comprising the steps of: (a) introducing the brine or brackish feed water solution into an FCDI desalination cell as described herein; (b) pressurizing the feed water solution to a first pressure $P_1$; (c) applying a positive polarity to the approximately one half of the plurality of electrodes designated to have a positive polarity; (d) applying a negative polarity to the remaining approximately one half of the plurality of electrodes designated to have a negative polarity; (e) introducing the carbon slurry into the cell annular lower end cap, at a second pressure $P_2$, through the lower end cap inlet, urging the carbon slurry to pass through the inner tubular spaces of the plurality of tubular members, into the annular upper end cap space and then out of the upper end cap outlet; and (f) directing the treated solution out the outlet port to a desired location. In one embodiment, this method may further comprise the steps of adjusting the first and second pressure so that $P_1 > P_2$. In another embodiment, this method may further comprise the steps of directing the carbon slurry from upper end cap outlet to a carbon slurry reservoir, and separating and removing any brine solution that may have accumulated in the carbon slurry prior to redirecting the carbon slurry back through the lower end cap inlet.

BRIEF SUMMARY OF DRAWINGS

FIGS. 13A-13C Front view of tube sheet showing bores (FIG. 13A), and side profile views of the tube sheet showing channels for O-rings (FIG. 13B), and location of sealing O-rings in said channels (FIG. 13C) as depicted in Hobbs et al.

DETAILED DESCRIPTION OF THE INVENTION

Example 1

To overcome the complexities of the stack design with their inevitable linear geometries; and further remove the dependencies on ionic membranes that will inevitably deteriorate from the abrasive slurries, a simple concept employing multiple ultrafine filter tubes 40 is described. A novel flow channel design is therefore disclosed deploying hollow cylindrical ion exchange membranes 40 that break with the paradigm of sandwich cell designs and unlock the full potential of capacitive carbon flow electrodes for environmental technologies. Referring to FIGS. 4, 5, 6A, and 6B, to overcome the complexities of the stack design with their inevitable linear geometries, a schematic FCDI desalination system cell concept 1A employing a multiple ultra-fine (UF)

filter tubes 40 is described. In one embodiment, the tubes 40 are of the variety offered by Spectrum Laboratories, Inc., (Rancho Dominguez, Calif.) and described as biotech Cellulose Ester Membranes used for isolating ionic species; ionically conducting but electrically insulating. Clusters 40*a* of these tubes 40, nominally ¼ inch in diameter (in this embodiment) are housed inside a cylindrical housing 20 (which preferably is constructed of plastic), and sealed according to the principles described in U.S. Pat. No. 9,061,251 ("Hobbs et al.") entitled "Self-Sealing Membrane Contactor with PTFE Tubular Membranes", which is incorporated herein by reference for all purposes. The Hobbs et al. device will be generally described below in connection with prior art FIGS. 11, 12, 13A and 13B.

Figure 1:
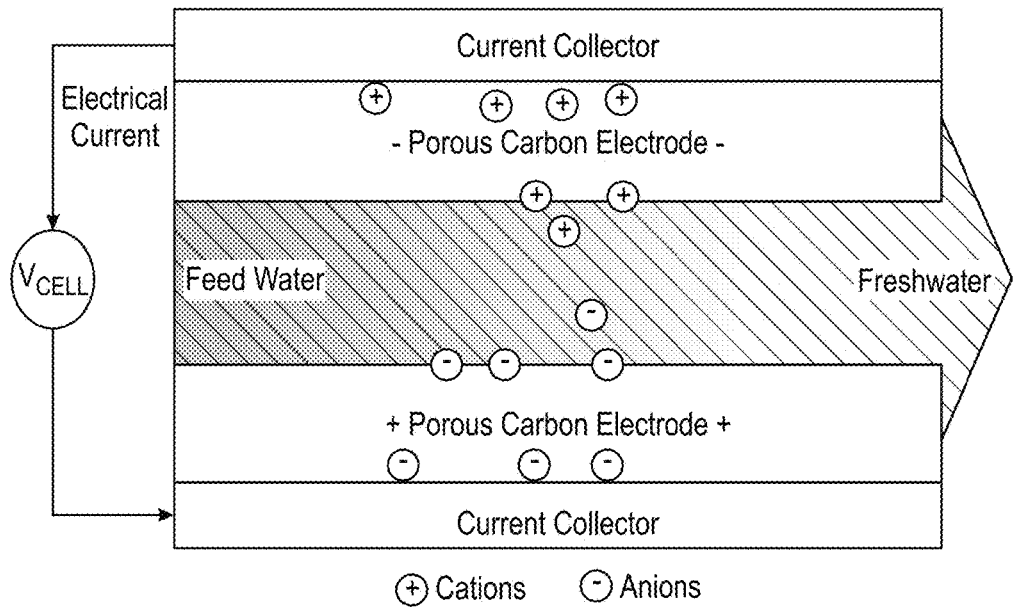
FIG. 1 depicts a schematic view of the prior art CDI desalination process described by Porada, Zhao, et al.
Figure 2:
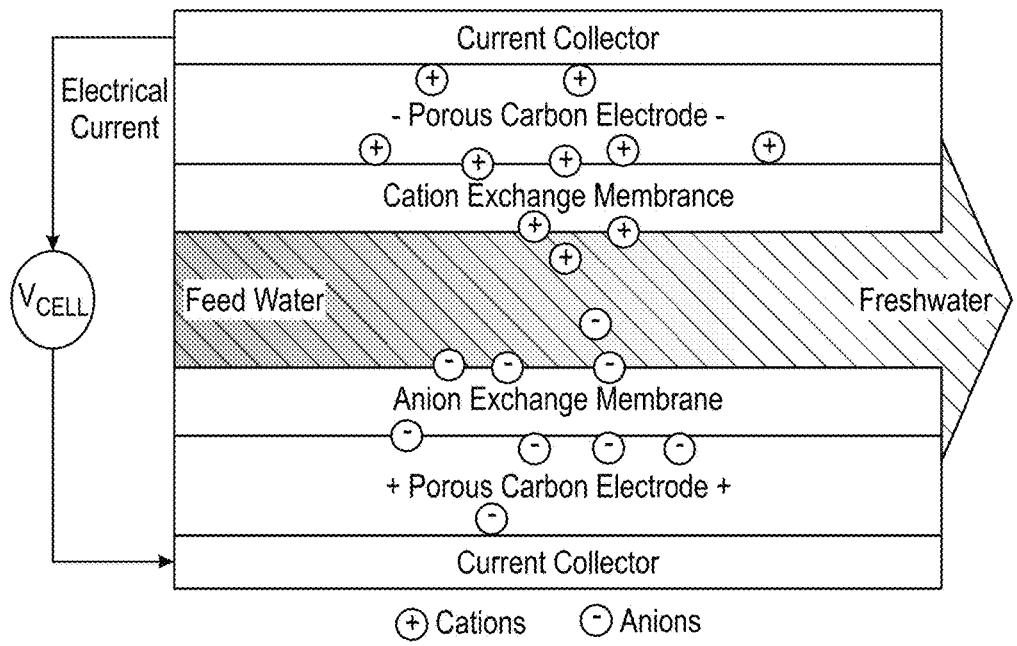
FIG. 2 depicts a schematic view of the prior art MCDI desalination process described by Porada, Zhao, et al.
Figure 3:
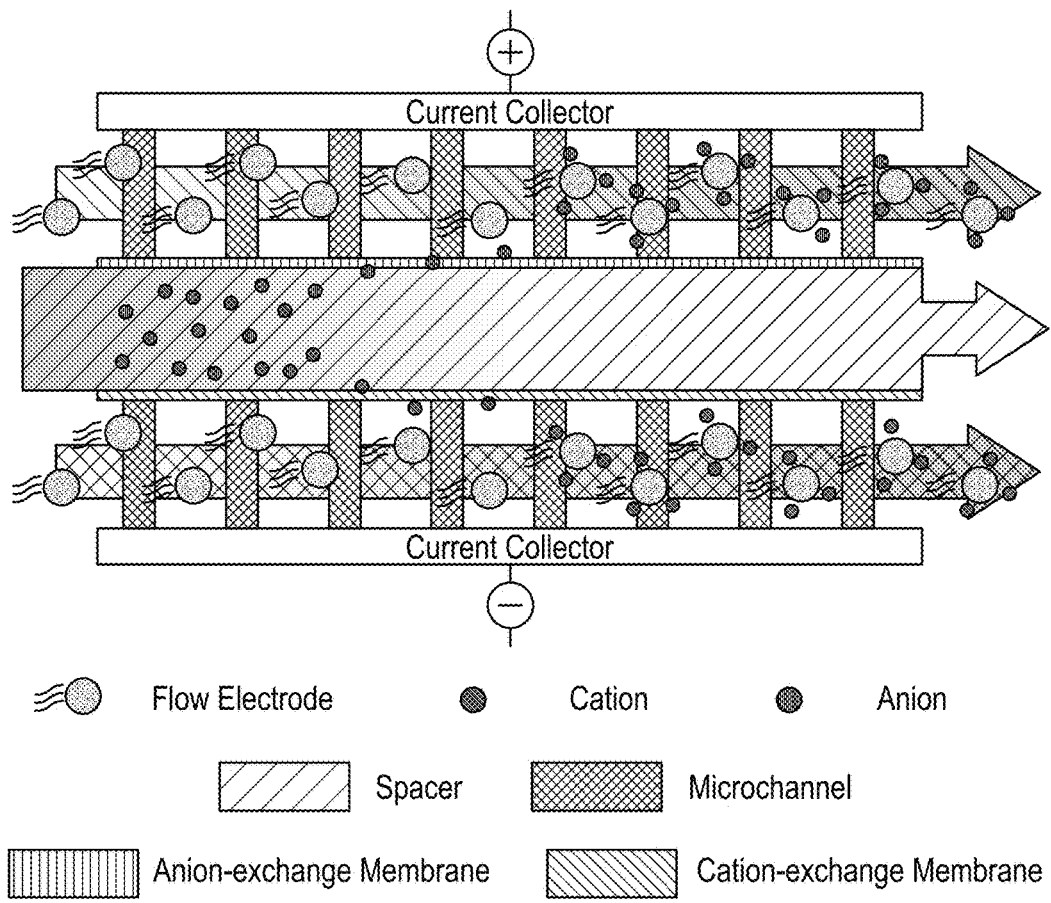
FIG. 3 depicts a schematic view of the prior art FCDI desalination process described by Jeon, et al.
Figure 4:
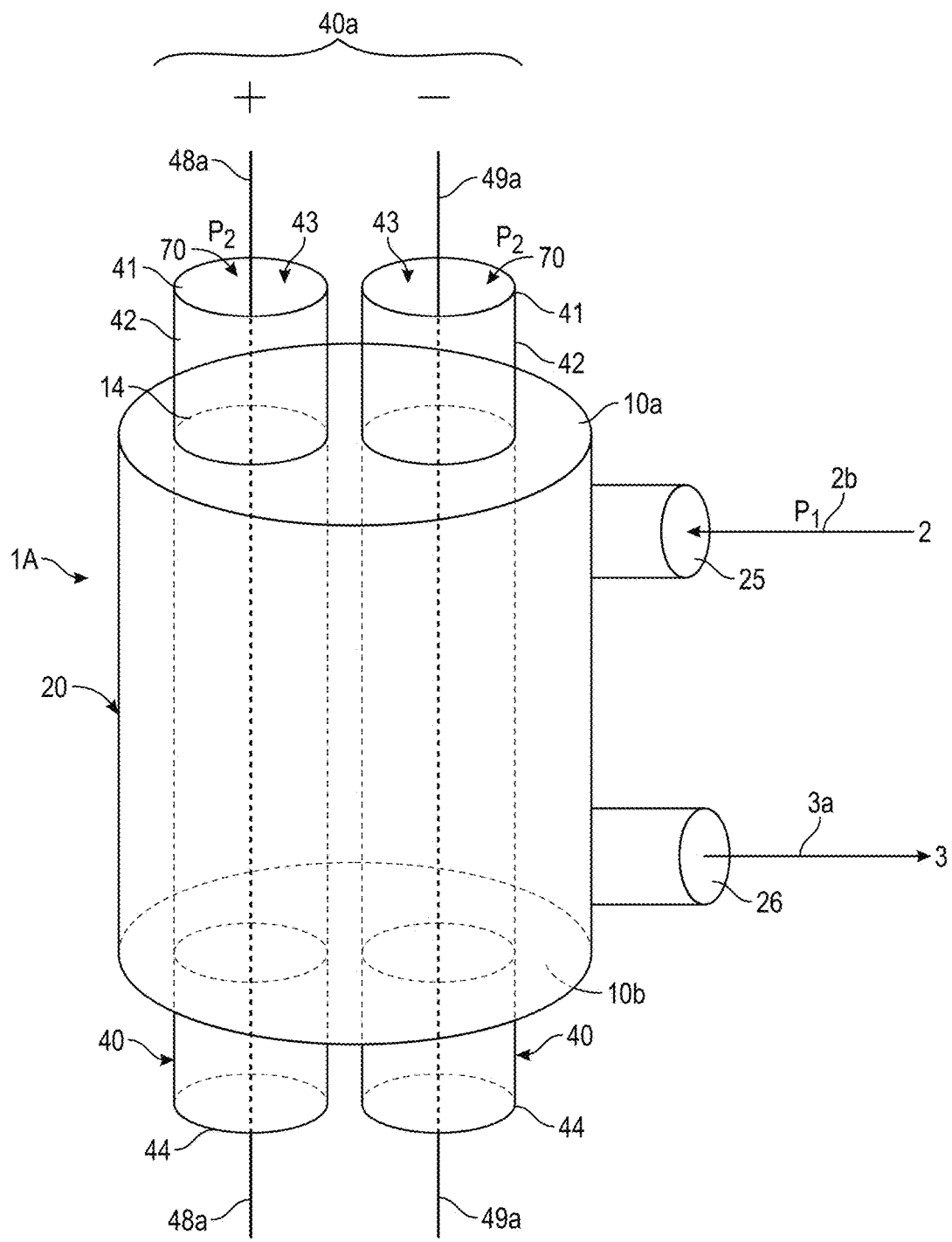
FIG. 4 depicts a schematic view of a FCDI desalination system according to one embodiment of the present disclosure.

A saline solution 2 (e.g., seawater) to undergo desalination is passed around the outside of the individual tubes 40 within the cluster 41 via side inlet ports 25 to the cylindrical housing 20, and ultimately the treated, desalinated water 3 exits out of the outlet port 26 into conduit 3*a*. Each tubular membrane 40 comprises an upper end 41, a lower end 44, and a tubular membrane wall member 42 defining an internal bore space 43. During operation, a carbon slurry 70 is permitted to transit the inside bore space 43 of the tubes 40 between upper and lower tubular membrane ends 41 and 44. The carbon slurry 70 circulates through the tubular membrane interior spaces 43 via a flow circuit not shown. Axially interspersed inside each of the individual tube internal bores 43 are wires 48*a*, 49*a* (fixed electrodes), constructed preferably of titanium and being preferably cylindrical in shape, extending through the full length of the individual tubes 40. Half of the wires 48*a* are connected to one polarity and the remaining half 49*a* to the opposite polarity according to the principles of FCDI. FIG. 4 illustrates an embodiment where the housing 20 contains two tubes 40. One tube 40 has a positive (+) polarity titanium wire electrode 48*a* running axially therethrough while the other tube 40 has a negative polarity (−) titanium wire electrode 49*a* running axially therethrough. Each tube 40 is capable of receiving a carbon slurry 70 within its interior tubular space 43. Other configurations are possible, for example, employing more tubes 40 in the housing 20.

The liquid to undergo desalination 2, e.g., seawater, enters the housing 20 through a feed solution inlet 25 (via pump 2*a*), and then circulates back out of the housing 20 through the treated solution outlet 26. Preferably, the electrodes 48*a*, 49*a* are oriented such that adjacent tubes 40 contain opposed polarity electrodes.

The system therefore provides a large surface area for the ingress saline solution 2. The system 1A also provides unique parallel wire geometry (48*a*, 49*a*) to create parallel flows of charged carbon slurry 70. In one embodiment, the carbon slurry 70 was prepared by mixing 85% wt % of porous carbon material (YP50-F, Kuraray Chemical, Osaka, Japan) with a saline solution. The improvement of performance and efficiency of this geometry is due to the cylindrical shape of the electrode(s) 48*a*, 49*a*. This provides an enhancement over the one sided linear plates employed in the traditional classic CDI geometries. A characteristic that makes this efficient is that two parallel current carrying wires (48*a*, 49*a*) exhibit a unique electric field. Clusters of geometrically interspersed polarities (40*a*) combine to focus the electric field intensities in a preferred electric field configuration that combine to enhance the overall field intensity.

Scale up of this system is twofold. For example, an increase in the desalination capacity can be achieved by: (a) increasing the dimensions of a single cell (FCDI desalination system 1A), and/or (b) incorporating multiples of the cell 1A.

Figure 5:
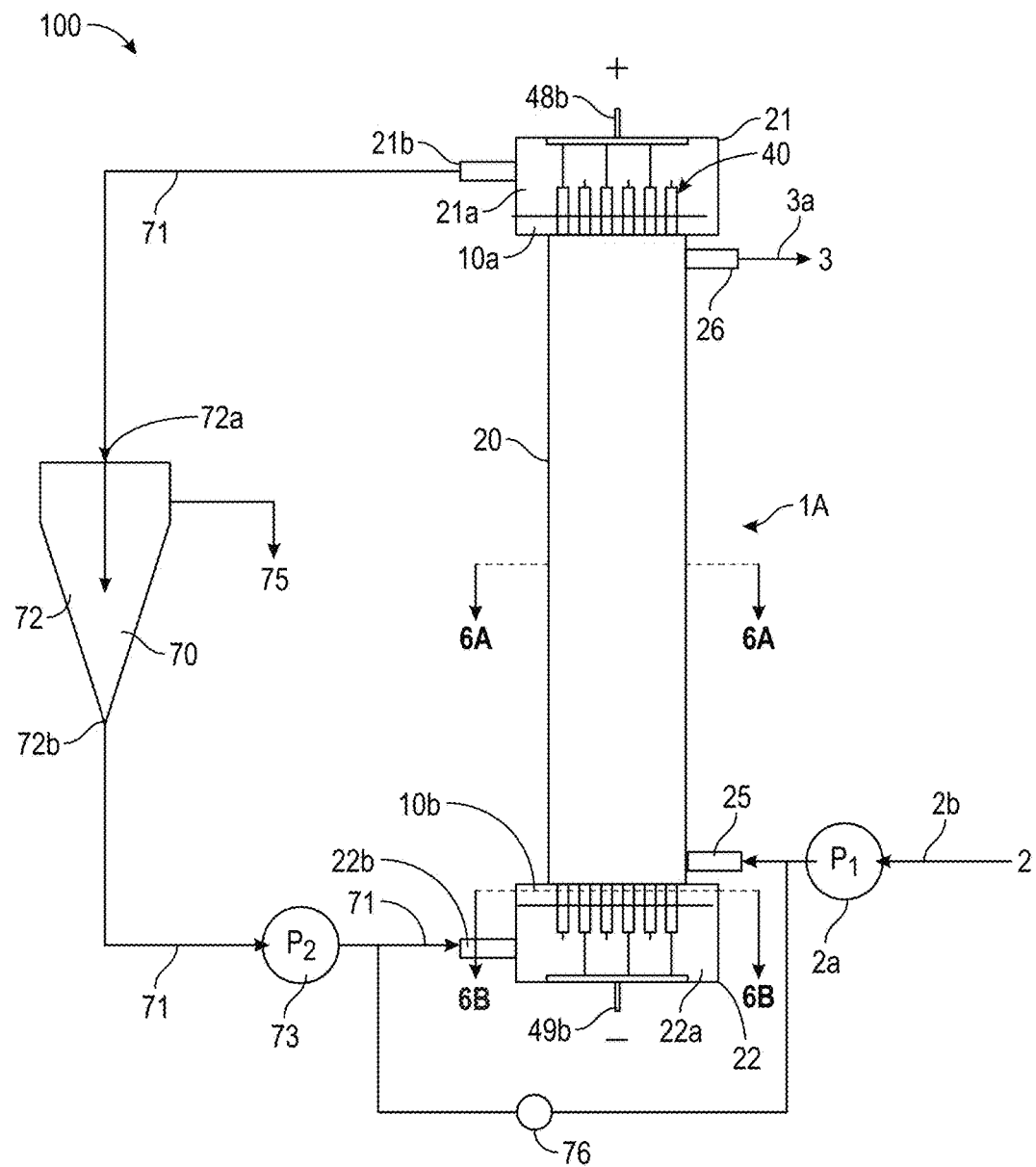
FIG. 5 depicts a schematic view of a FCDI desalination system according to one embodiment of the present disclosure.
Figure 6A:
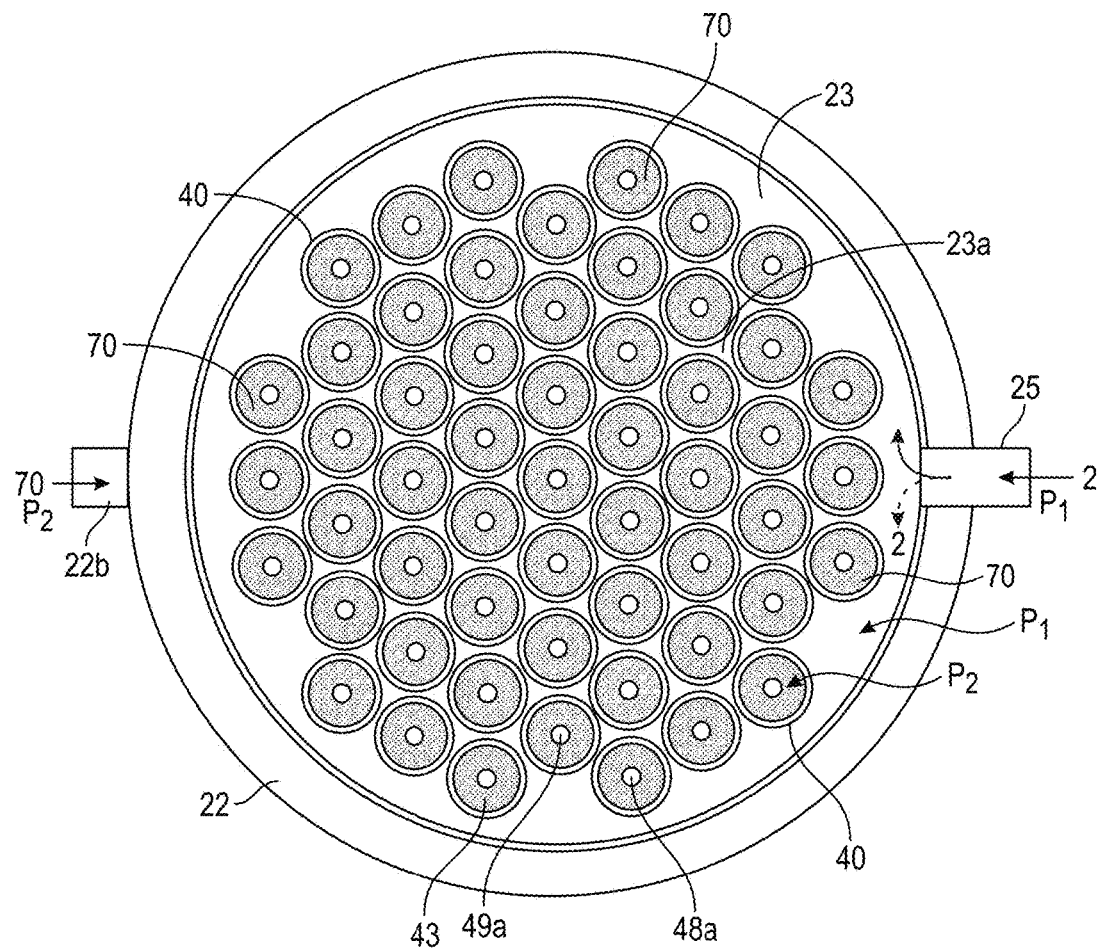
FIG. 6A depicts a cross-sectional view of the FCDI desalination system cell taken along lines 6A-6A of FIG. 5.
Figure 6B:
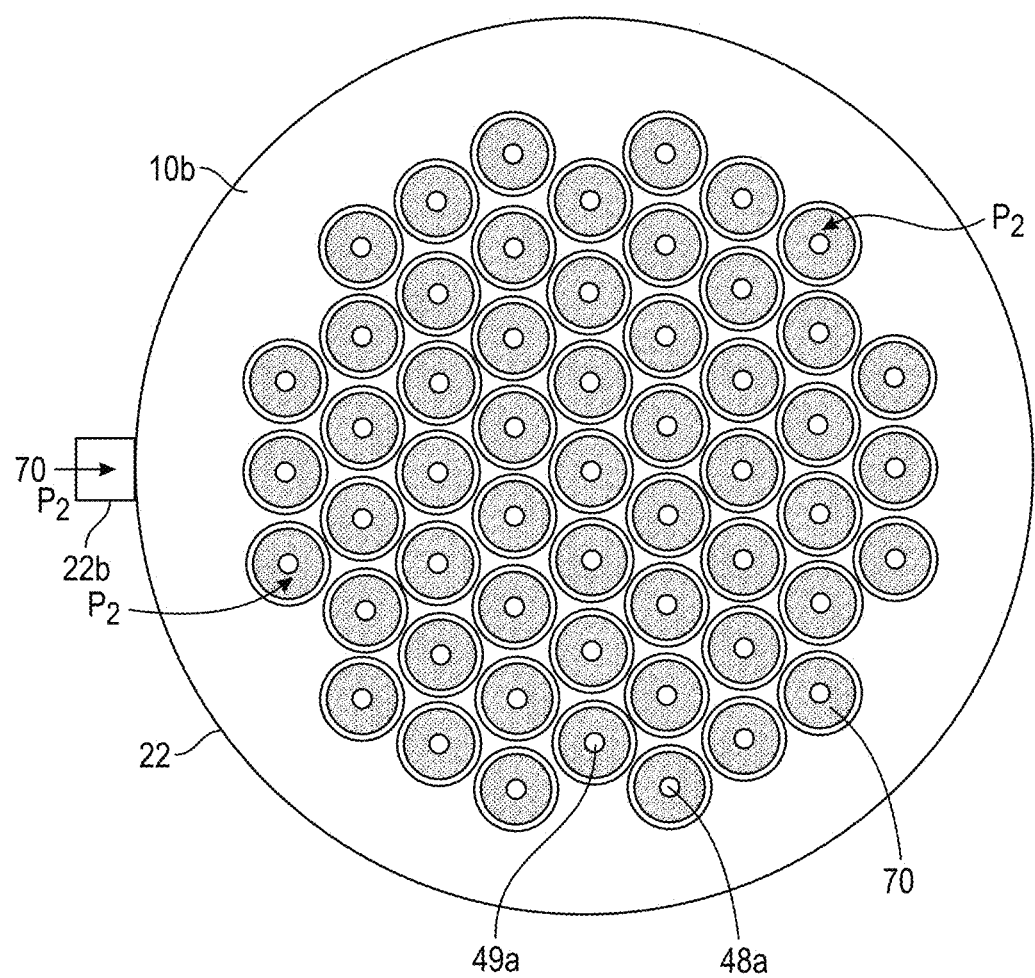
FIG. 6B depicts a cross-sectional view of the FCDI desalination system cell taken along lines 6B-6B of FIG. 5.

Referring now to FIGS. 5, 6A and 6B, there is illustrated a schematic diagram of an exemplary FCDI desalination system 100. The system 100 contains one or more FCDI desalination system cells 1A capable of receiving a saline feed water solution 2 through inlet 25. In one embodiment, each cell 1A generally comprises a cylindrical tubular member or housing 20 having an interior chamber 23 sealed via top and bottom end caps 21, 22. The housing upper end cap 21 comprises a sealing member 10*a* that seals the top end of the cell housing interior space 23, an upper end cap interior space 21*a*, and an upper end cap port 21*b* in fluid communication with the interior space 21*a*. Similarly, the housing lower end cap 22 comprises a sealing member 10*b* that seals the lower end of the cell housing interior space 23, a lower end cap interior space 22*a*, and a lower end cap port 22*b* in fluid communication with the interior space 22*a*.

Extending through the entire length of the cell interior space 23, and through the respective upper and lower seals 10*a*, 10*b*, are one or more, preferably a plurality, of membrane tubes 40. Each membrane tube 40 has an upper end 41, a lower end 44 and an inner tubular membrane space 43. The tubular member upper end 41 opens into fluid communication with the upper end cap interior space 21*a* and the tubular member lower end 44 opens into fluid communication with the lower end cap interior space 22*a*. The upper and lower seals 10*a*, 10*b* form a watertight seal around the outside of each tubular member 40. Therefore, the upper end cap interior space 21*a* and lower end cap interior space 22*a* are in fluid communication via the inner tubular membrane space 43 of each tubular membrane 40, but are otherwise isolated from the cell interior space 23.

Inserted from each end (41, 44) but singularly arranged in each tube are individual electrode wires (48*a*, 49*a*), such as cylindrical titanium electrode wires. Approximately one half of the electrodes 48*a* are configured to carry a positive charge while the other approximately one half of the electrodes 49*a* are configured to carry a negative charge. Preferably, the electrodes 48*a*, 49*a* are arranged such that for the most part each adjacent membrane tube 40 carries a positive wire 48*a* and a negative wire 49*a*, respectively. In one embodiment, the clusters of positive electrodes 48*a* are welded to a common positive electrode 48*b* located proximate, e.g., the upper end 41 of the membrane tubes 40, and the clusters of negative electrodes 49*a* are welded to a common negative electrode 49*b* located proximate, e.g., the lower end 44 of the membrane tubes 40.

A carbon slurry (electrolyte slurry) 70 is pumped (via slurry pump 73 at a desired pump pressure $P_2$) through conduit 71 into the lower end cap internal space 22*a* (through inlet port 22*b*). The carbon slurry 70 then proceeds through the inner tubular membrane space 43 of each tubular membrane 40 and into the upper end cap internal space 21*a*, and then out of the discharge port 21*b*. The carbon slurry 70 can then be recirculated back to pump 73 for reuse. In one embodiment, the carbon slurry 70 exiting the cell 1A is directed via conduit 71 into an electrolyte (carbon slurry) reservoir 72 through reservoir inlet 72. If necessary, excess (overflow) saline solution can be separated out of the slurry and discharged through brine overflow conduit 75. The carbon slurry 70 can then exit the reservoir 72 through discharge port 72*b* and again be directed back into the cell 1A via conduit 71 and pump 73.

As the saline feed solution 2 is pumped (via pump 2*a* at desired feed pump pressure $P_1$) through conduit 2*b* into the interior space 23 of the cell 1A, it flows around the outsides of a cluster of spaced-apart membrane tubes 40 located therein, including through the channels 23a created between the tubes 40. The cluster of membrane tubes 40 are preferably closely packed together. The feed solution 2 undergoes desalination and then exits the cell as desalinated fluid 3 through discharge port 26.

In one mode of operation, the fluid pressure $P_1$ of the saline feed solution 2 within the cell internal space 23 is greater than the fluid pressure $P_2$ of the carbon electrolyte slurry 70 within the tubular membrane internal space 43 causing a positive pressure differential 76 from the outside of the tubular membrane to the interior space 43 of the tubular membrane.

FIG. 6A shows a cross-sectional view of the FCDI desalination system cell 1A taken across a midsection of the housing to illustrate one exemplary arrangement of the cluster of membrane tubes 40 spanning the length of the cell interior space 23. FIG. 6B depicts a cross-sectional view of the FCDI desalination system cell 1A taken across the lower seal 10b in the lower end cap 22 (the seal arrangement in the upper seal 10a being the same).

In one embodiment of the operation of the FCDI desalination system 100, the cell 1A comprises a housing 20 with quantity 60+ ultra filtration (UF) tubes 40 vertically arranged as described above. The filter properties are such that the tube material rejects carbon particles but allows cationic and anionic particles to pass, i.e., Na+ and Cl—. A 1.5 VDC power supply is attached. A carbon slurry 70 is pumped down the tubes 40. Each adjacent tube ideally carries positively 48a and negatively 49a charged carbon, respectively. Seawater (or other water to be desalinated) 2 enters the bottom of the cell 1A through inlet 25 and "floods" around the tubes 40 in a separate liquid circuit within the cell interior space 23. The respective ions are attracted from the seawater 2 into the carbon slurry 70. A characteristic that makes this efficient is that two parallel current carrying wires (48a, 49a) exhibit a unique electric field. Furthermore, there is an exceptionally high density of tubes 40. Furthermore, a high viscosity carbon slurry 70 can be pumped (via pump 73) through the tubes 40. Also, by maintaining a small pressure differential of seawater over the carbon (where $P_1 > P_2$), a small percentage of water from feed solution 2 egresses from the cell interior space 23 into the carbon slurry circuit (tube interior spaces 43) which serves to create a means to remove the charge concentrate (brine) as shown via the brine overflow 75. Scale up is much simplified by using a larger diameter cell housing. The components of this system 100 are robust and low cost.

The carbon slurry reservoir (electrolyte reservoir) 72 provides storage and brine separation in one unit 72. Excess water is imparted to the carbon circuit (43, 71) by over pressuring by a small amount ($P_1$) the seawater circuit (2b-25-23-26-3a) over the pressure ($P_2$) of the carbon slurry circuit (22b-22a-43-21a-21b-71). This is monitored by a differential pressure sensor 76. This excess water dilutes and removes the accumulated recombined ionic species Na+ and Cl— through a simple filter overflow 75.

The carbon slurry 70 is pumped up through the tubes 40 or could be drawn up through the tubes by vacuum pump (not shown). Each adjacent tube preferably carries positively and negatively charged carbon respectively. Seawater 2 enters the bottom of the cell 1A inner chamber 23 and "floods" around the tubes 40 in a separate liquid circuit. The respective ions are attracted from the seawater 2 into the carbon slurry 70. A characteristic that makes this more efficient than linear flat electrodes is that two parallel current carrying wires (or opposite charge) exhibit a unique electric field. Furthermore, there is an exceptional high density of tubes afforded with this configuration of parallel tubes).

Viscosity of the carbon slurry 70 may be increased tenfold. Desalination efficiency is directly proportional to the viscosity, i.e., surface area of carbon 70. Increasing the viscosity is the demise of all linear plate FCDI models, but is possible with the system of the present disclosure.

Notwithstanding the above, in the embodiment shown in FIGS. 4, 5, 6A, and 6B, the efficiency of this embodiment can become degraded due to co-ions escaping from the flow electrodes 40 back through the UF material and into the solution 2 residing in the cell interior space 23.

Example 2

Figure 7:
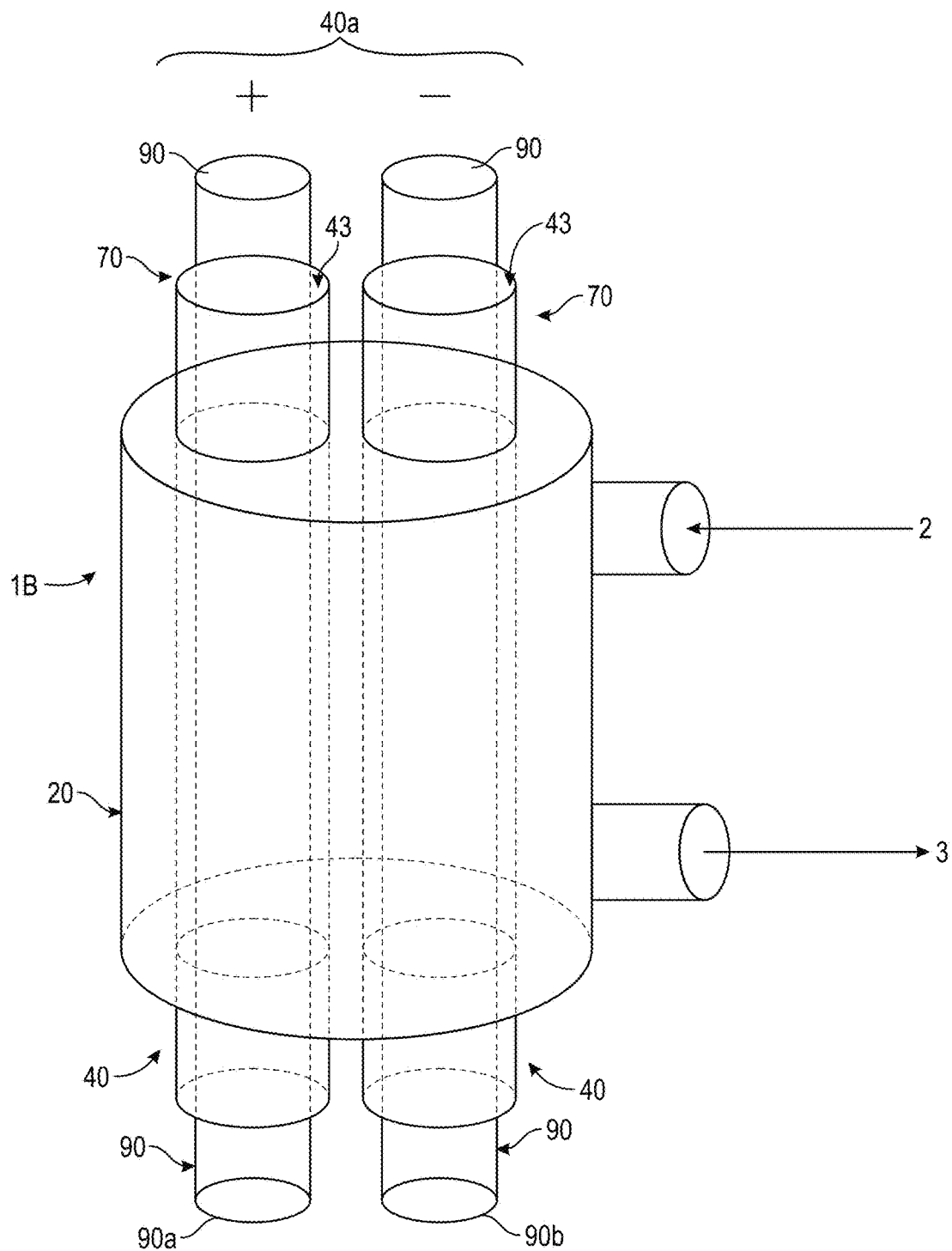
FIG. 7 depicts a schematic view of a FCDI desalination system cell according to another embodiment of the present disclosure.

Referring now also to FIG. 7 in connection with the prior Figures described above, another embodiment of the above configuration advantageously employs the use of tubular ionic membranes 40, such as those available via Membranes International Inc., NJ, USA. In this embodiment, a further enhancement is provided to the FCDI desalination system cell 1B by elimination of the low surface area titanium wire electrodes 48a, 49a (used in FCDI desalination system cell 1A described above) in favor of the use of graphite electrodes (rods) 90 that mostly fill the cross sectional area of each membrane tube inner space 43. For example, as shown, rod 90a is a positively charged graphite electrode rod which creates a cationic membrane tube and rod 90b is a negatively charged graphite electrode rod which creates an anionic membrane tube. The carbon slurry 70 is pumped or drawn by vacuum between the inner membrane surface (inner membrane space 43) of the tube and the outer surface of the graphite rods 90. A further efficiency improvement is achieved by machining parallel grooves or spiral threaded surfaces (not shown) over the length of the graphite rods 90 to increase the (wetted) surface area of the rod with the carbon slurry 70. See A. Rommerrskirchen et al., "Single Module Flow—Electrode Capacitive de ionization for Continuous Water desalination", *Electrochemistry Communications* (2015). Grooves, spiral threads and other machined surfaces on the rods 90 may be employed. FIG. 7 illustrates an embodiment where the housing 20 contains two tubes 40. Other configurations are possible, for example, employing more tubes 40 in the housing 20.

Example 3

Figure 8:
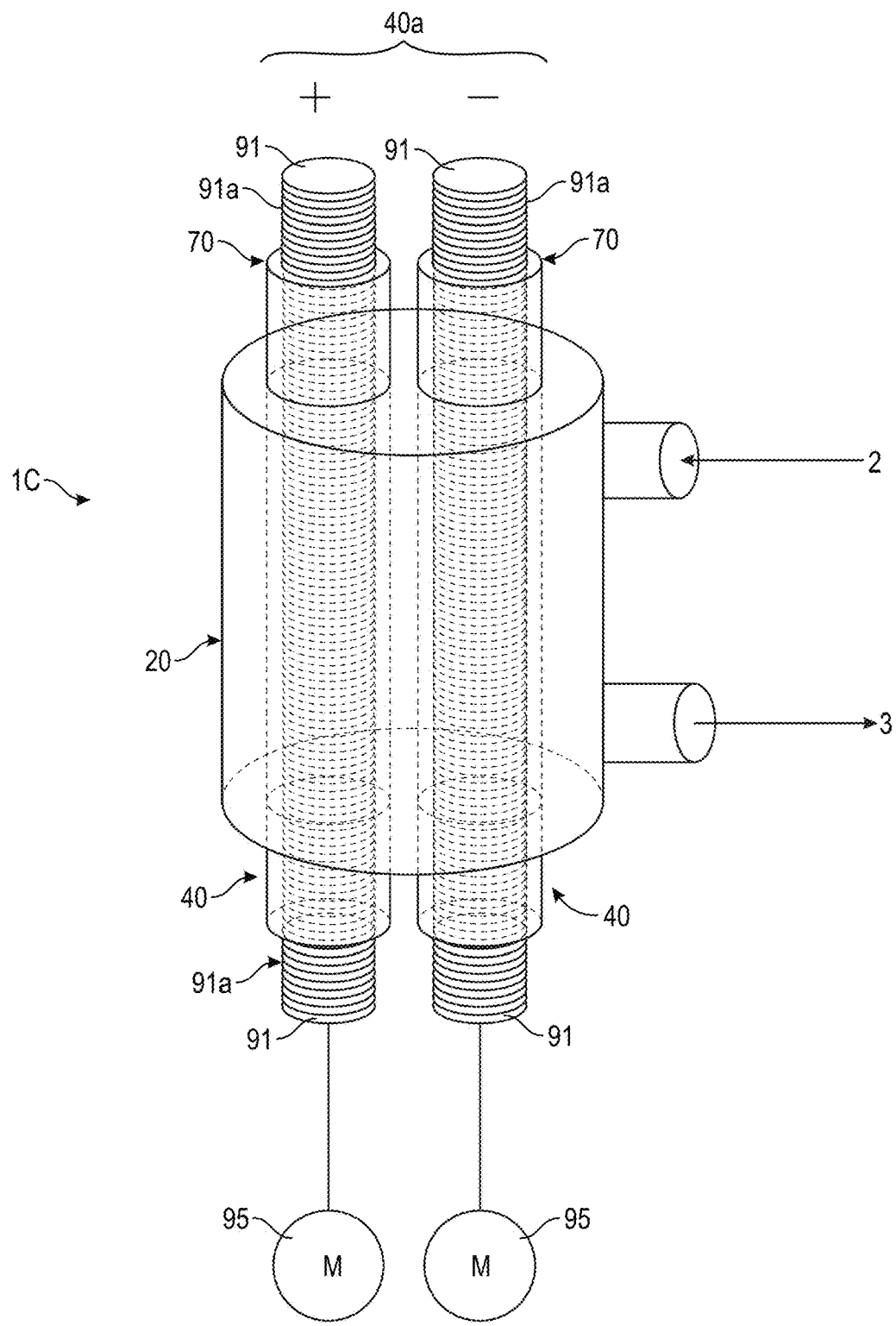
FIG. 8 depicts a schematic view of a FCDI desalination system cell according to yet another embodiment of the present disclosure.

Referring also to FIG. 8, the above two configurations in examples 1 and 2 require slurry pumps to move the carbonaceous material. These typically are peristaltic or diaphragm pumps which disadvantageously contribute to the overall energy consumption of the system.

Energy consumption is reduced and efficiency increased if the carbon slurry 70 viscosity can be increased to that of a paste consistency such as tooth paste. This eliminates the pumps as described above but evokes the use of a screw pump or progressive cavity pump. However, in this embodiment the screw portion is fabricated from the graphite rods 91, such as illustrated in FIG. 8 where the threaded or grooved portions 91a urge the carbon slurry through the inner space 43 of the tube 40 by action of the motors 95. Here, the threaded or grooved rod 91 also serves as the respective electrode anionic or cationic electrode. With this enhancement, high viscosity carbon slurries may be transported through the tubular membranes 40 resulting in an enhancement of the efficiencies achieved in the FCDI art. The graphite rods are rotated by small gear motors 95.

Example 4

Figures 9, 9A:
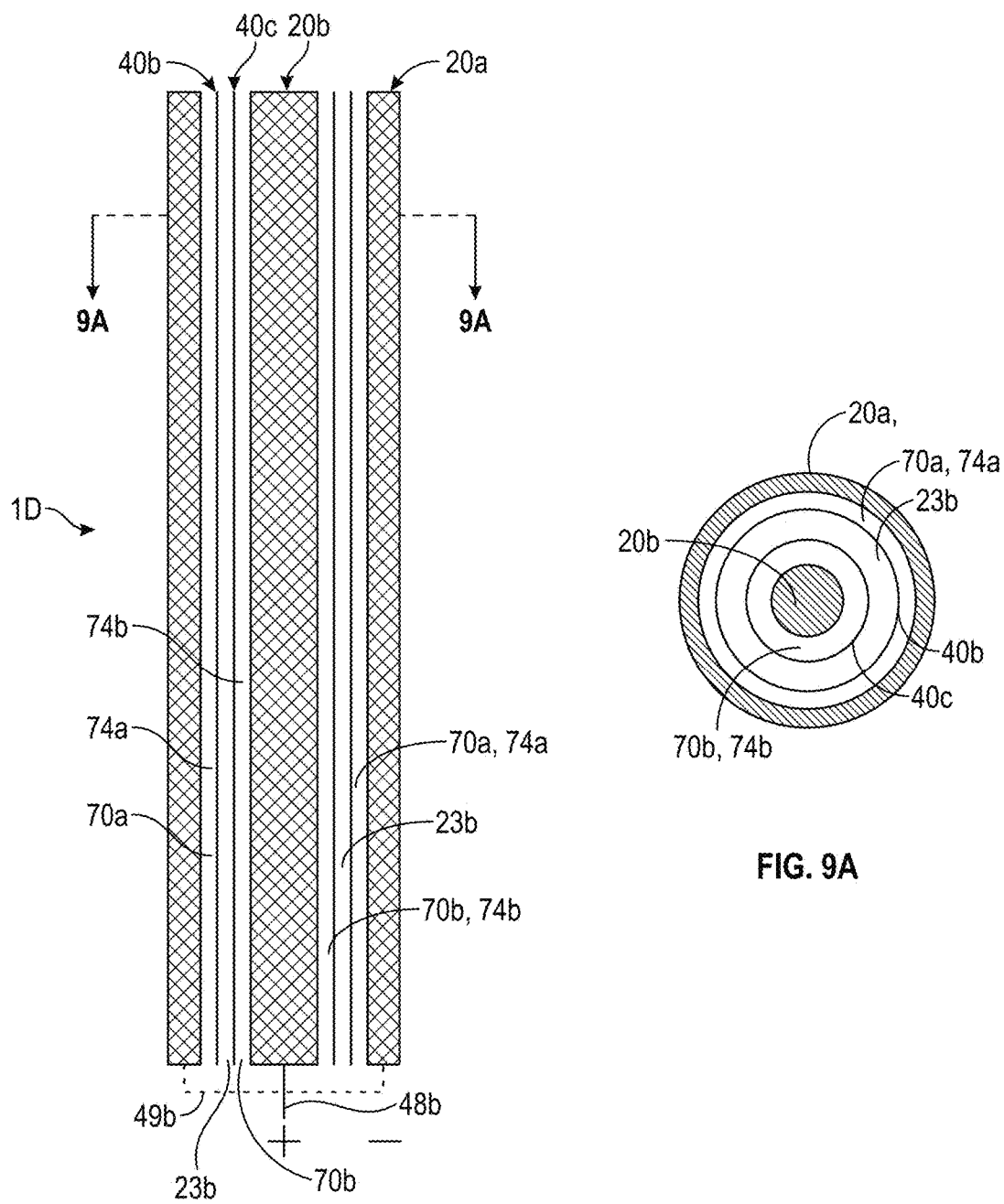
FIG. 9 depicts a schematic longitudinal sectional view of a FCDI desalination system cell according to yet another embodiment of the present disclosure.
FIG. 9A is a cross-sectional view taken along the lines 9A-9A in FIG. 9.

Referring now to FIG. 9, common to the embodiments shown above in Examples 1 through 3 is the necessity to maintain a strong electric field between the respective electrodes or to realize a configuration that exhibits a maximum of capacitance resulting in highest efficiency of the invention. Capacitance (C) is inversely proportional to the separation of two electrically charged bodies. The closer the electrodes are to each other, the greater the capacitance. It will be understood that capacitance (C) is defined as C=q/V, where q is the charge (read as ions) attracted to the conductor; and V being the voltage across the conductors.

In another preferred embodiment of the FCDI desalination system cell 1D, the cell 1D comprises two axially concentric tubular membranes 40b, 40c positioned around a center solid core graphite rod 20b, and "packaged" within a cylindrical graphite tube 20a such as depicted in FIG. 9.

The spacing between these elements shall be minimized to maximize the capacitance, which in turn enhances the ion removal from the saline solution. Typical spacing is ¼ inch but a preferred spacing is ⅛".

With reference to FIG. 9, the two carbon slurry solutions, termed anolyte (negatively charged carbon slurry) 70a and catholyte (positively charged carbon slurry) 70b, flow on each side of the water gap 23b that is formed between the two concentric tubular membranes 40b, 40c coaxially aligned with each other.

Also to be noted is the ratio of slurry flow rate and feed water flow rate. A nominal ratio is anywhere between about 50:1 and about as low as 5:1 depending upon the viscosity of the slurry. A preferred rate of 20:1 using a carbon recipe slurry of 30 centistokes.

This embodiment provides for an outside graphite cylinder housing 20a of inside dimensions 3.88" as available from the Graphite Store, USA. Internal to this cylinder 20 are two tubular ionic membranes of diameters nominally 3.50" (outer membrane 40b) and 2.90" (inner membrane 40c) respectively. These membrane tubes are available from, e.g., Membranes International Inc. NJ. USA. Coaxial to this concentric array is a solid core graphite rod 20b of outside dimensions 2.50" such as available the Graphite Store, USA.

The slurry 70 enters the cell 1D and its flow path then feeds into the gaps 74a, 74b. In this particular embodiment, as shown in FIG. 9, slurry flow gap 74a is defined as the annular space between the outside surface of outer concentric tubular membrane 40b and the inside surface of tubular housing (e.g., graphite housing) 20a, which as shown here, is negatively charged via electrode 49b. As slurry 70 enters gap 74a it becomes negatively charged and continues to flow through annular gap 74a as an anolyte (negatively charged) carbon slurry 70a. Similarly, slurry flow gap 74b is defined as the annular space between the inside surface of inner concentric tubular membrane 40c and the outside surface of the center (graphite) core 20b, which as shown here, is positively charged via electrode 48b. As slurry 70 enters gap 74b it becomes positively charged and continues to flow through annular gap 74b as a catholyte (positively charged) carbon slurry 70b. The role of the wire electrodes, coil electrodes and mesh electrodes described herein it to charge the slurry 70. The graphite is connected to a positive or negative power supply as described, and the slurry is therefore in electrical contact with the graphite. The carbon slurry scavenges the ionic content, (Na+, Cl—, etc.) by electrostatic attraction through the ionic membranes. When the two slurries (70a, 70b) emerge from the cell, they are combined, and the carbon slurry is discharged. The ionic content is then filtered off as brine. The combined carbon slurries are recirculated back to the cell.

Figure 10:
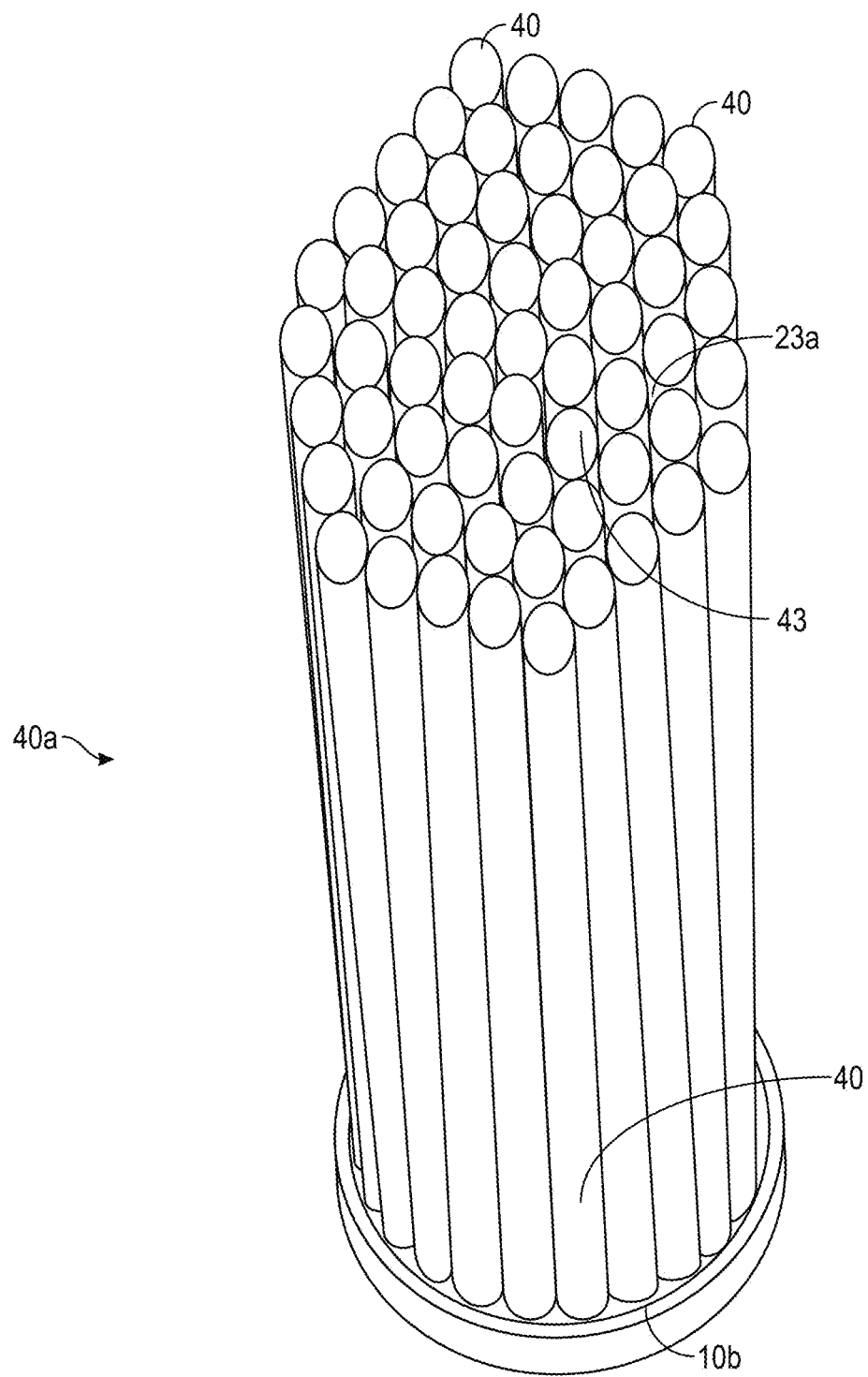
FIG. 10 depicts a close up view of a plurality of tubular membranes emerging from a cylindrical housing as a cluster.

Referring now to FIG. 10, there is generally depicted a perspective view of a cluster 40a of tubular membranes 40 emerging through a seal, such as lower end cap seal 10b.

It will be appreciated by those having the benefit of the present disclosure that the desalination system of the present disclosure may be used to desalinate dirty water. For example, unlike with reverse osmosis desalination, the present system need not require the brine feed solution to first be pretreated since the system is only concerned with removing Cl— and Na+ ions. However, if the brine feed solution contains oil contamination, pretreatment to remove the oil is recommended. Additionally, as will also be appreciated by those having the benefit of the present disclosure, the concentration of the carbon slurry can be changed as may be desired.

As noted above, U.S. Pat. No. 9,061,251 to Hobbs, et al. is instructive on the general construction of a cell housing a cluster of tubular membranes. Referring now to FIGS. 11, 12, 13A, 13B and 13C (corresponding to Hobbs FIGS. 1, 2, 3A, 3B, 3C, with the numbering reflected make each a 100s series number by adding a "1" in front of the original Hobbs numbering). Hobbs discloses a tubular membrane module and its method of manufacture wherein tubular membranes form an interference self-sealing fit with hard tube sheets with the aid of a hard hollow mandrel inserted at the end of the tubular membranes. The tubular membranes are comprised of porous, compressible PTFE and/or fluorocopolymers. The self-sealing method described herein requires no heat treatment, allows for ease of manufacture without destruction of the tubular membranes and without the processing complexity of utilizing any additional potting agent, extrusion, or chemical cross-linking of any polymeric adhesives. The self-sealing PTFE tubular membranes have superb chemical resistance and temperature resistance, and through the benefits of this invention, offer higher pullout resistance than typically observed with potting materials such as polyurethane and epoxy. In addition, the self-sealing method is reversible and non-destructive (whereas chemical potting and sealing methods using heat are not), as one can easily remove one or more damaged tubes and replace them.

The tube sheets used in Hobbs are produced from any suitable polymer or other material that is harder than the tubular membrane and preferably softer than the insertable hollow mandrel. The insertable hollow mandrel is produced from any suitable polymer, polymer composite, or metal that is harder than the tubular membrane and generally harder than the tube sheet material. Generally speaking one would not want the insertable hollow mandrel to deform, but rather the tubular membrane to compress between the two harder surfaces of the tube sheet and the insertable hollow mandrel. While the tube sheet may be harder than the insertable hollow mandrel, this combination runs the risk of possibly damaging the tubular membrane on assembly or deformation of the insertable hollow mandrel on assembly or over time.

Figure 11:
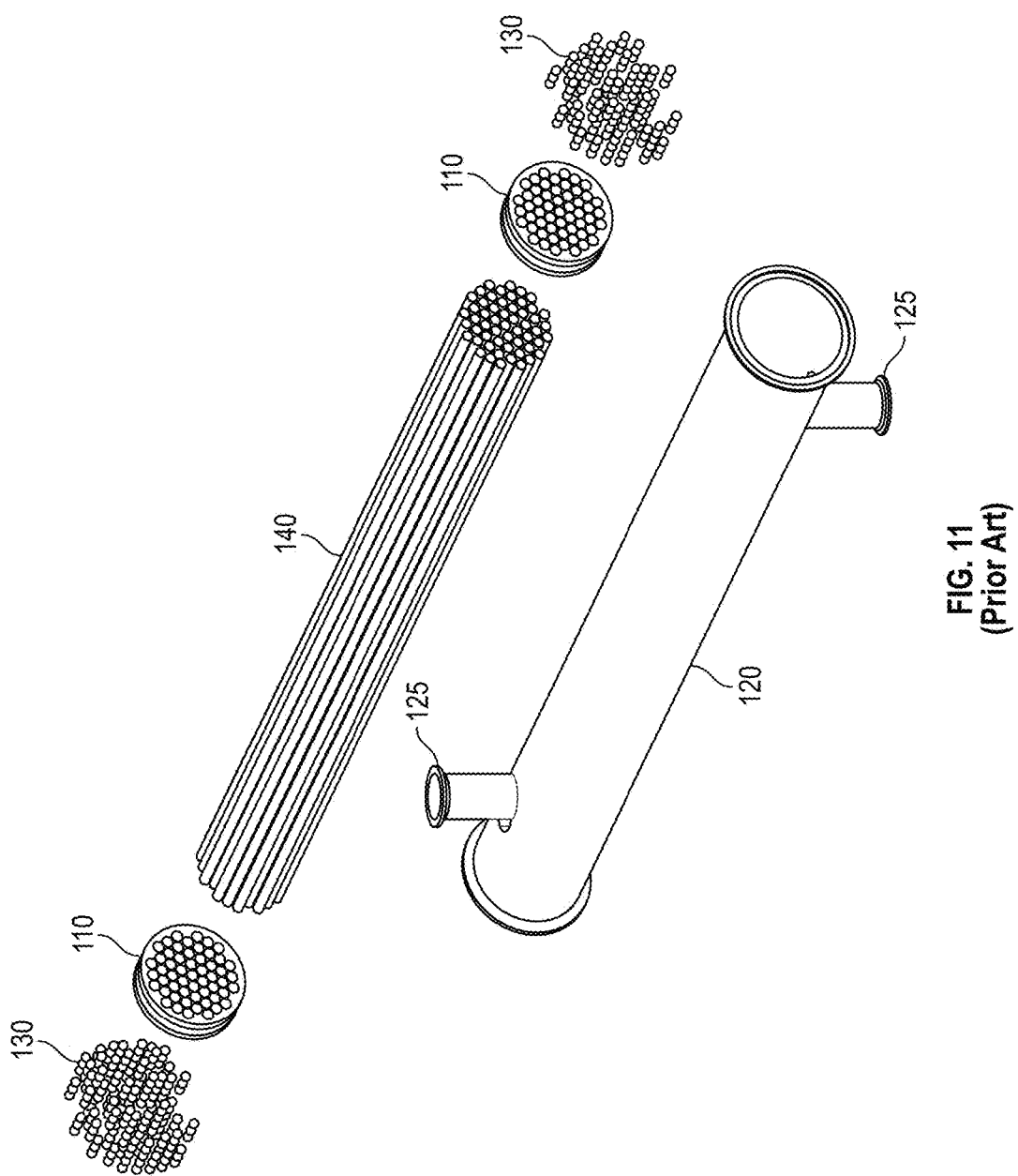
FIG. 11 depicts an exploded view of a prior art housing, tubular membranes, tube sheets, and insertable hollow mandrels as taught in U.S. Pat. No. 9,061,251 ("Hobbs et al."), which is incorporated herein by reference for all purposes.

According to Hobbs, the key elements used to assemble a contactor or filter module employing the self-sealing tube design are shown in an exploded view in FIG. 11. The elements consist of one or more tubular membranes 140, one or more tube sheets 110, a suitable housing 120 designed to accommodate a tube sheet 110 in either end, and an insertable hollow mandrel 130 for each end of the tubular membranes 140 that penetrate the holes 114 in the tube sheet 110. The housing is fitted with one or more ports 125 through the wall of the housing 120 to allow discharge of flow that has passed from the inside channel of the tubular membranes and through the membrane wall. Conversely the flow may enter one or more of the ports 125 in the wall of the housing 120 and penetrate the walls of the tubular membrane 140 and discharge through the central channel of each of the tubular membranes 140.

Figure 12:
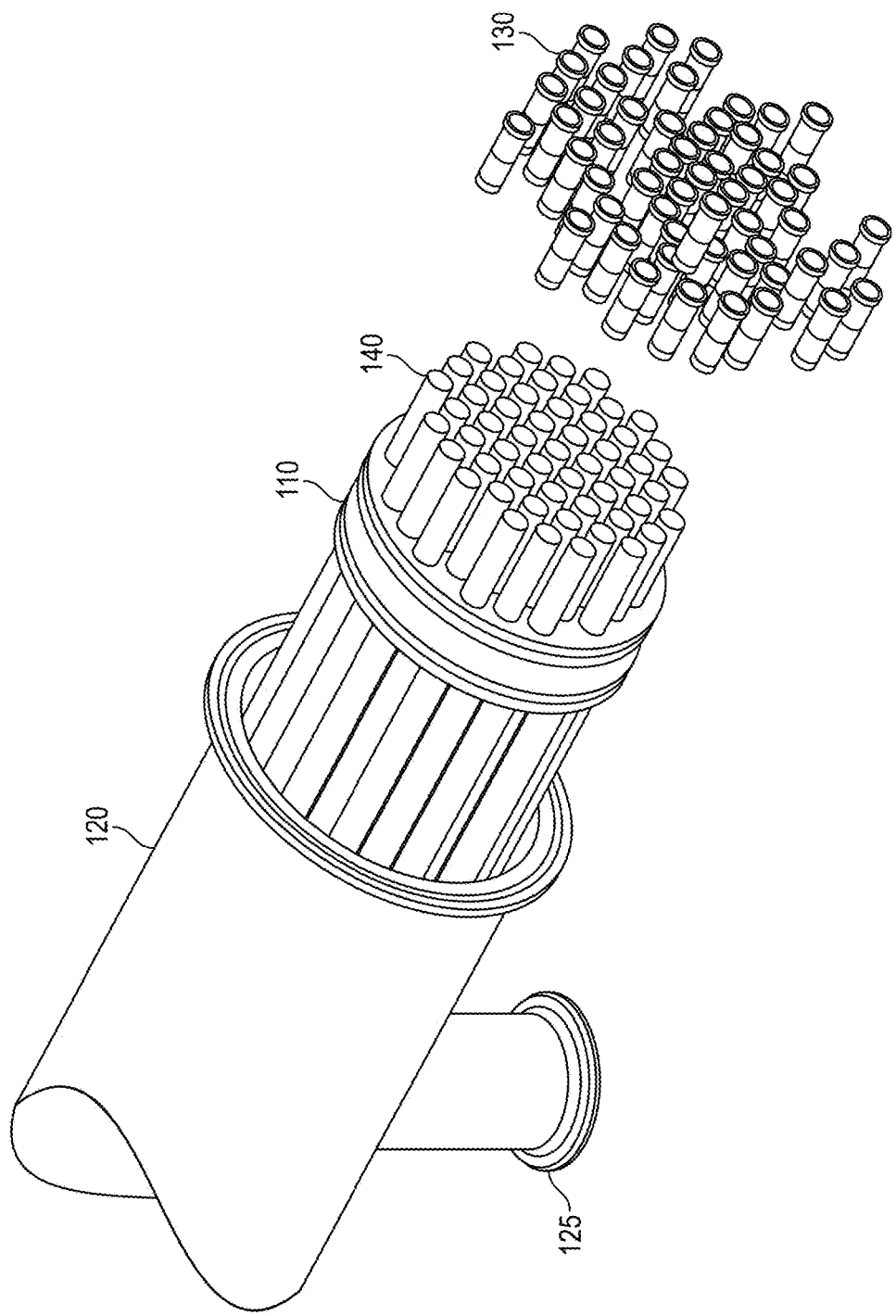
FIG. 12 depicts a close up of one end of the Hobbs et al. prior art housing of FIG. 11 showing exploded view of tube sheet, tubular membranes, and insertable hollow mandrels.

FIG. 12 is an enlargement of one of the tube sheet ends showing the relationship between the housing 120, the insertable hollow mandrels 130, the tubular membranes 140, and the tube sheet 110.

According to Hobbs, to produce a contactor or filter module using the self-sealing tube design, one starts with a tube sheet 110 shown in cross section and profile in FIG. 13A that has been machined to fit snugly within the contactor or filter module housing 120. The tube sheet 110 must be able to be attached to, and sealed into the housing 120 after the tubular membrane mounting steps are complete. This sealing may be accomplished by application of a suitable adhesive around the perimeter 111 surface of the tube sheet 110 FIG. 13B or through the use of an O-ring seal or seals 112 FIG. 13C mounted in channels 113 on the tube sheet 110. The adhesive would act as both a seal and a means of attaching the tube sheet 110 to the housing 120 while the use of O-rings would require an additional means of fixing the tube sheet to the housing. Such fixing means, to attach the tube sheet to the housing can include, but are not limited to, the use of a spanner ring on the outside of the tube sheet, retaining pins inside the housing, or a series of screws through the housing wall into the tube sheet. In addition, there are other fixing or sealing means that have various limitations that are known to those practiced in the art.

The tube sheets 110 for the Hobbs contactor or filter module design are drilled with a series of holes 114 to receive the tubular membranes. These openings in the tube sheet 110 may be counter bored to provide a flush surface on the tube sheet 110 once fit with the insertable hollow mandrel 130. The holes 114 for the tubular membranes are arrayed in a pattern dictated by the design of the contactor or filter module but are generally arrayed in a uniform pattern across the face of the tube sheet face 110. The spacing between the holes 114 is dictated by the size of the outer lip or flange on the insertable hollow mandrel, the diameter of the countersink if any, and the nature of the application. The number of holes determines the packing density of the tubular membranes. The packing density is defined as the sum of the individual cross sectional areas of the tubular membranes 140 divided by the available cross sectional area of the opening of the housing 120 expressed as a percent. The holes 114 may be cylindrical in shape, but may also have tapered walls, or be cut from other geometries to better fit the insertable hollow mandrel. Tapered walls facilitate a tight fit for the insertable hollow mandrel 130.

The thickness of the tube sheet 110 may vary, and is generally dependent on the diameter of the housing 120 and the length of the insertable hollow mandrel 130. The tube sheet 110 should be thick enough to allow for secure fastening to the housing 120 without displacing unnecessary volume inside the housing 120. It is desirable that the thickness of the tube sheet 110 be about 10% to 25% of the thickness of the inner diameter of the housing 120, although for smaller housings, thicker tube sheets may be employed to be certain that the insertable mandrel 130 is fully embedded in the tube sheet 110. Less than about 10% of the thickness of the inner diameter of the housing may not allow sufficient thickness to provide insertable mandrel stability and a seal around the insertable mandrel, and greater than about 25% would lead to unnecessary wasted space and material.

The diameter of the holes 114 in the tube sheet 110 is determined by the outer diameter of the tubular membrane 140. The diameter of the hole 114 is generally equal to the outer diameter of the tubular membrane 40 but may also be slightly smaller or slightly larger than the outer diameter of the tubular membrane 140 depending on the softness of the tubular membrane 140, the packing density, and the desired profile of the tubular membrane as it enters the tube sheet 110. If the holes 114 in the tube sheet 110 are much smaller than the diameter of the tubular membrane 140, then the wall of the membrane will have a propensity to fold in on itself, creating a potential leak and prohibiting the insertable mandrel 130 from seating properly. If the hole 114 is slightly larger than the diameter of the tubular membrane 140, then the tubular membrane must be able to stretch to accommodate the larger insertable mandrel 130. This runs the risk of tearing or damaging the membrane or creating a pocket where debris may accumulate. When fully inserted, the tubular membrane is locked in place and a fluid tight interference fit seal is established between the lumen end of the tubular membrane and the inner chamber of the housing.

One of the many advantages of the Hobbs method is that the mounting and sealing the porous tubular membranes in the tube sheets is reversible. During the course of use of a membrane contactor or filter, membrane tubes will occasionally be damaged, become plugged, tear, or otherwise fail, rendering the unit useless. A failed tube will cause the entire module to become inoperable. With other methods of mounting tubular membranes into end plates or tube sheets, the tubular membrane is permanently affixed to the tube sheet. With this invention, this shortcoming is eliminated, allowing the end user to remove and replace a singular or multiple tubular membrane(s) without destroying the housing, the tube sheet, or the remaining tubular membranes. It is conceivable that all the tubes could be removed and replaced, saving the housing and tube sheet assembly.

Figure 14:
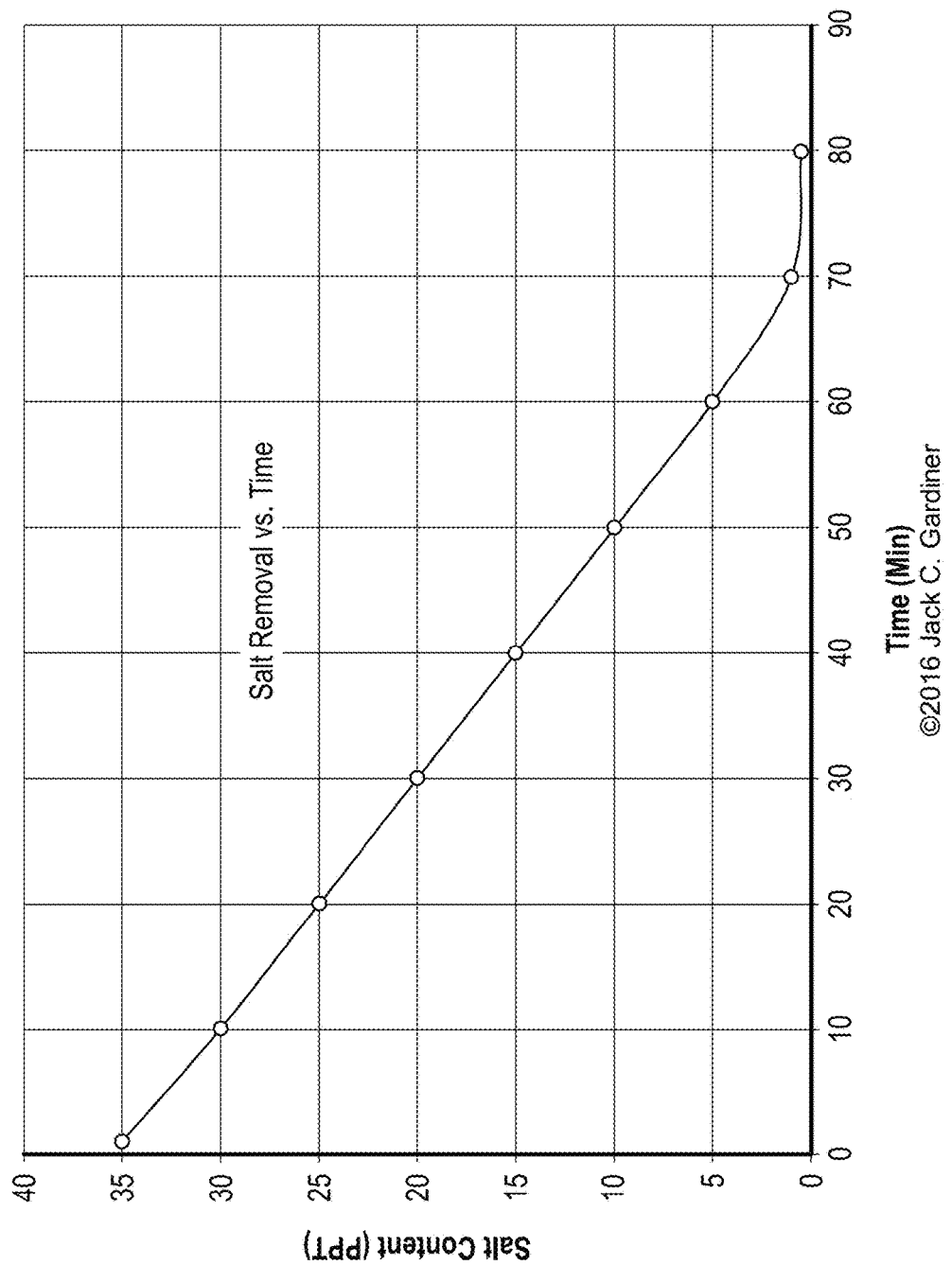
FIG. 14 illustrates a graph of the 'salt' removal, (salinity or conductivity reduction) versus time for a 36" long cell formed from the configuration described in FIG. 9.
Figure 15:
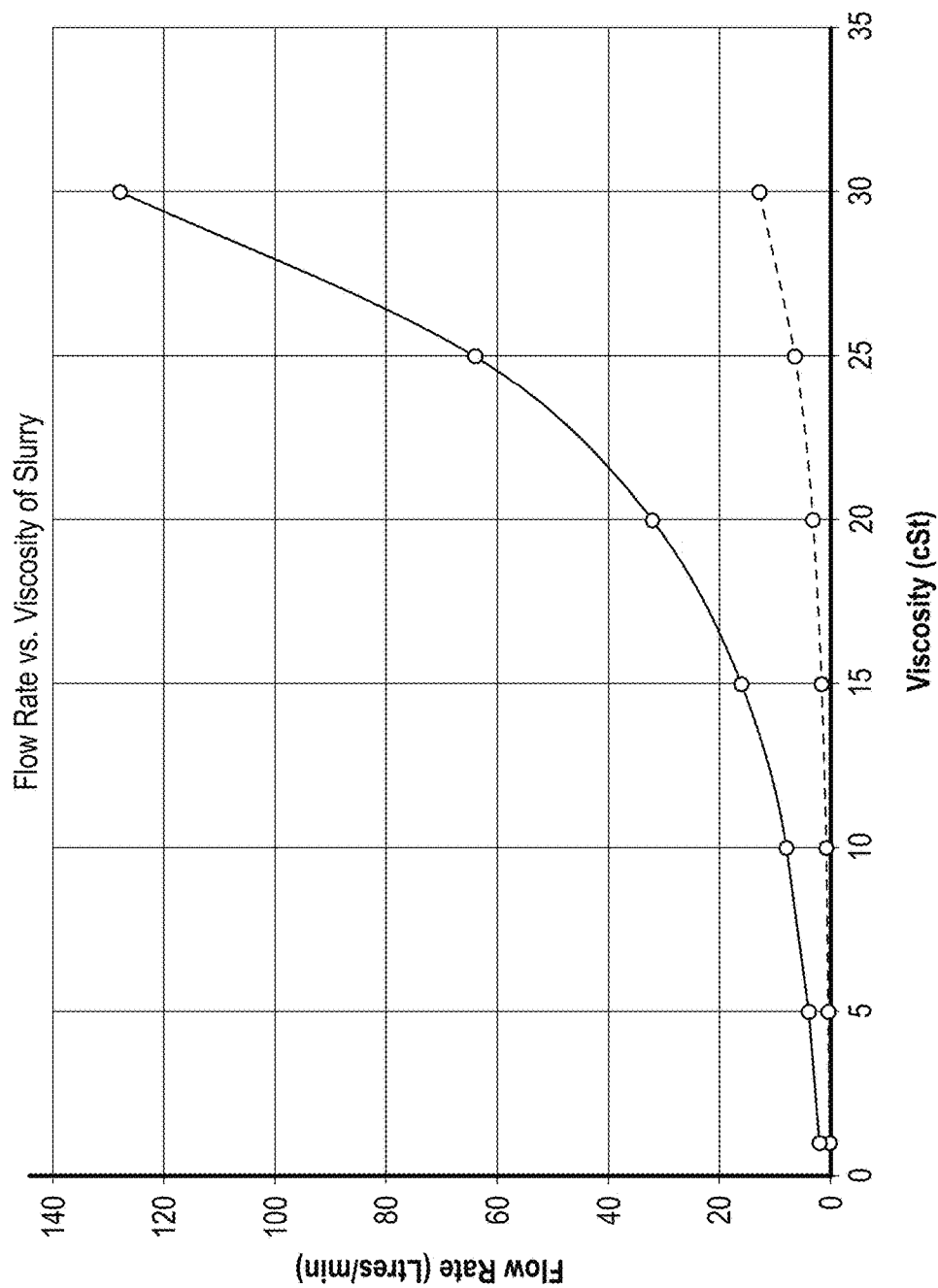
FIG. 15 illustrates the flow rate through the embodiment of FIG. 9 as a function of salt removal.

Referring now to FIG. 14, there is illustrated a graph of the 'salt' removal, (salinity or conductivity reduction) versus time for a 36" long cell formed from the configuration described in FIG. 9. The cell was operated in a recirculation mode. A one gallon volume of saline water of 35 ppt was circulated at a rate of 0.25 gpm. FIG. 15 illustrates the flow rate through the embodiment of FIG. 9 as a function of salt removal.

Figure 16:
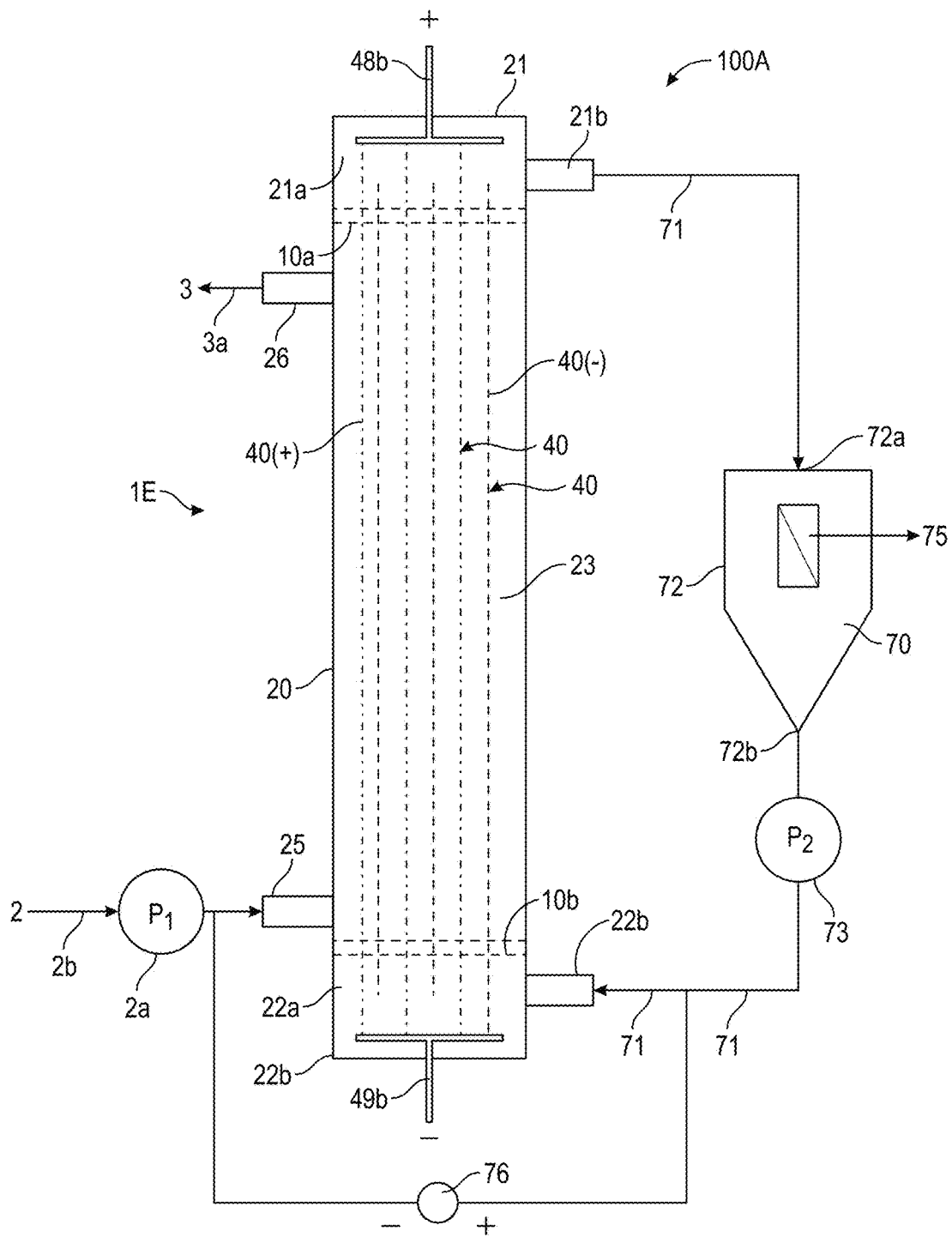
FIG. 16 depicts a schematic view of an FCDI desalination system according to another embodiment of the present disclosure.
Figure 17A:
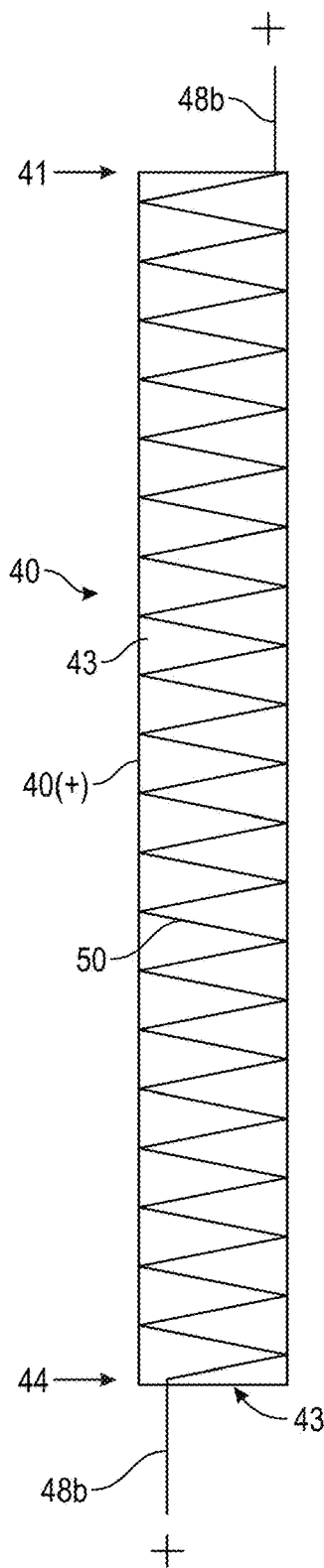
FIG. 17A depicts a cross-sectional view of a tubular membrane with a coiled wire electrode running through its inner tubular space according to another embodiment of the present disclosure.
Figure 17B:
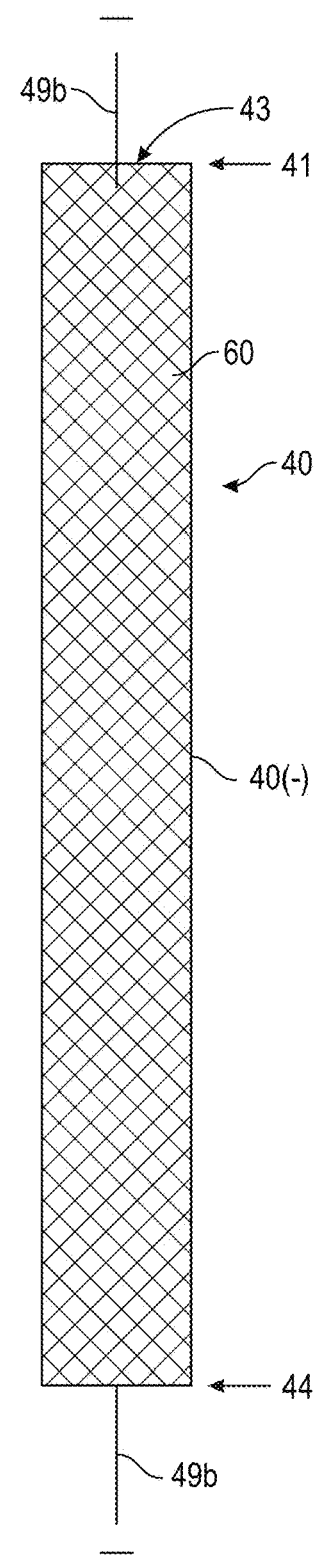
FIG. 17B depicts a cross-sectional view of a tubular membrane with a mesh electrode running through its inner tubular space according to another embodiment of the present disclosure.

Referring now to FIGS. 16, 17A and 17B, there is illustrated a schematic diagram of another exemplary FCDI desalination system 100A similar to that described above in connection with FIG. 5. The system 100A contains one or more FCDI desalination system cells 1E capable of receiving a saline feed water solution 2 through inlet 25. In one embodiment, each cell 1A generally comprises a cylindrical tubular member or housing 20 having an interior chamber 23 sealed via top and bottom end caps 21, 22. The housing upper end cap 21 comprises a sealing member 10a that seals the top end of the cell housing interior space 23, an upper end cap interior space 21a, and an upper end cap port 21b in fluid communication with the interior space 21a. Similarly, the housing lower end cap 22 comprises a sealing member 10b that seals the lower end of the cell housing interior space 23, a lower end cap interior space 22a, and a lower end cap port 22b in fluid communication with the interior space 22a.

Extending through the entire length of the cell interior space 23, and through the respective upper and lower seals 10a, 10b, are one or more, preferably a plurality, of membrane tubes 40. Each membrane tube 40 has an upper end 41, a lower end 44 and an inner tubular membrane space 43. The tubular member upper end 41 opens into fluid communication with the upper end cap interior space 21a and the tubular member lower end 44 opens into fluid communication with the lower end cap interior space 22a. The upper and lower seals 10a, 10b form a watertight seal around the outside of each tubular member 40. Therefore, the upper end cap interior space 21a and lower end cap interior space 22a are in fluid communication via the inner tubular membrane space 43 of each tubular membrane 40, but are otherwise isolated from the cell interior space 23.

Inserted from each end (41, 44) but singularly arranged in each tube are electrodes, such as a coiled electrode 50 as depicted in FIG. 17A or a mesh electrode 60 as depicted in FIG. 17B. These electrodes can be constructed of suitable materials, such as titanium or the like. Much like as illustrated in FIG. 5, approximately one half of the electrodes (50 or 60) are configured to carry a positive charge (e.g., FIG. 17A illustrates a coiled electrode 50 receiving a positive (+) charge from, e.g., a positively charged common electrode 48b to create a positively charged tubular membrane 40(+)) while the other approximately one half of the electrodes are configured to carry a negative charge (e.g., FIG. 17B illustrates a mesh electrode 60 receiving a negative (−) charge from, e.g., a negatively charged common electrode 49b to create a negatively charged tubular membrane 40(−)). Preferably, the electrodes (50 or 60) are arranged such that for the most part each adjacent membrane tube 40 carries a positive electrode and a negative electrode, respectively. In one embodiment, the clusters of positive electrodes (e.g., 48a in FIG. 5) are welded to a common positive electrode 48b located proximate, e.g., the upper end 41 of the membrane tubes 40, and the clusters of negative electrodes (e.g., 49a in FIG. 5) are welded to a common negative electrode 49b located proximate, e.g., the lower end 44 of the membrane tubes 40.

A carbon slurry (electrolyte slurry) 70 is pumped (via slurry pump 73 at a desired pump pressure $P_2$) through conduit 71 into the lower end cap internal space 22a (through inlet port 22b). The carbon slurry 70 then proceeds through the inner tubular membrane space 43 of each tubular membrane 40 and into the upper end cap internal space 21a, and then out of the discharge port 21b. The carbon slurry 70 can then be recirculated back to pump 73 for reuse. In one embodiment, the carbon slurry 70 exiting the cell 1E is directed via conduit 71 into an electrolyte (carbon slurry) reservoir 72 through reservoir inlet 72. If necessary, excess (overflow) saline solution can be separated out of the slurry and discharged through brine overflow conduit 75. The carbon slurry 70 can then exit the reservoir 72 through discharge port 72b and again be directed back into the cell 1E via conduit 71 and pump 73. As will be understood, the surface areas of these electrode embodiments (50, 60) in FIGS. 17A and 17B is higher than with the single wire electrode embodiments 48a, 49a in, e.g., FIG. 4.

As the saline feed solution 2 is pumped (via pump 2a at desired feed pump pressure $P_1$) through conduit 2b into the interior space 23 of the cell 1E, it flows around the outsides of a cluster of spaced-apart membrane tubes 40 located therein, including through the channels 23a created between the tubes 40. The cluster of membrane tubes 40 are preferably closely packed together. The feed solution 2 undergoes desalination and then exits the cell as desalinated fluid 3 through discharge port 26.

In one mode of operation, the fluid pressure $P_1$ of the saline feed solution 2 within the cell internal space 23 is greater than the fluid pressure $P_2$ of the carbon electrolyte slurry 70 within the tubular membrane internal space 43 causing a positive pressure differential 76 from the outside of the tubular membrane to the interior space 43 of the tubular membrane.

REFERENCES

The following represents an exemplary list of U. S Patent references:
U.S. Pat. No. 5,425,858 (Farmer) entitled "Method and Apparatus for Capacitive de Ionization, Electrochemical Purification, and Regeneration of Electrodes" (Jun. 20, 1995).
U.S. Patent Application Pub. No. 2011/0281169 (Zheng et al) entitled "Electrode for Flow Battery" (Nov. 17, 2011).
The following represents an exemplary list of non patent literature references:
Anderson M A; Cudero A L; Palma J; *Electrochimica Acta* 2010, 55, 3845
Biesheuvel P M, "Thermodynamic cycle analysis for capacitive deionization", *Journal of Colloid and Interface Science,* 2009, 332, 258
Biesheuvel P M; Zhao R; Porada S, van der Wal A; "Theory of membrane capacitive deionization including the effect of the electrode pore space", *Journal of Colloid and Interface Science* 2011, 361, 239
Campos, Jonathan W., Majid Beidaghi; Kelsey B. Hatzell; Christopher R. Dennison; Benjamin Musci; Volker Presser; Emin C. Kumbur and Yuri Gogotsi. "Investigation of carbon Materials for use as a flow able electrode in electrochemical flow capacitors." *Electrochimica Acta* 98 (2012); 123-130
Dennison, C. R., Beidaghi, M., Hatzell, K. B., Campos, J. W., Gogotsi, Y., Kumbur, E. C., 2014 *"Effects of Flow Cell Design on Charge percolation and storage in the carbon slurry electrodes of electrochemical flow capacitors."* Journal of Power Sources, Vol. 247, pp 489-496
Hatzell, K. B., Beidaghi, M., Campos, J. W., Dennison, C. R., Kumbur, E. C. and Gogotsi, Y., 2013 "A High Performance Pseudo capacitive capacitor: a new concept for rapid energy storage and recovery." Electrochimica Acta, Vol 111, pp #888-902
Jeon, Sung-il, Park, Hong-ran, Yeo, Jeong-gu, Yang, SeungCheol, Cho, Churl Hee, Han, Moon Hee and Kim, Dong Kook, "Desalination via a new membrane capacitive deionization process utilizing flow-electrodes", *Energy Environ. Sci.,* 2013, 6, 1471-1475.
Kim, S. J, Ko, S. H., Kang, K. H., Han, J., *Nature Nanotechnology* 2010, 5,297
Kim, Y. J.; Choi, J. H.; "Improvement of desalination efficiency in capacitive deionization using a carbon electrode coated with an ion-exchange polymer", *Water Research* 2010, 44, 990
Kondrat, S., Presser, V., Perez, C. R., Gogotsi, Y., Kornyshev, A. A., *Energy and Environmental Science.* 2012, DOI
Leonard K. C.; Genthe J R; Sanfilippo J L; Zeltner W A; Anderson M A; *Electrochimica Acta* 2009, 54,5286

Lee J H; Bae W S; Choi J H; "Electrode reactions and adsorption/desorption performance related to the applied potential in a capacitive deionization process", *Desalination* 2010, 258,159

Lee J B; Park K K, Eum H M; Lee C W; "Desalination of a thermal power plant wastewater by membrane capacitive deionization", *Desalination* 2006, 196 125

Li, H.; Gao, Y.; Pan, L., Zhang, Y., Chen, Y.; Sun, Z., "Electrosorptive desalination by carbon nanotubes and nanofibres electrodes and ion-exchange membranes" *Water Research* 2008, 42, 4923

Li H; Zou L D; Pan L k; Sun Z; "Novel graphene-like electrodes for capacitive deionization", *Environmental Science and Technology.* 2010, 44,8692

Li H; Zou L; Desalination 2011, 275, 62

Pasta M; Wessells C D; Cui Y; La Mantia F; "A desalination battery", *Nano Letters* 2012, 12, 839

Porada, S., Borchardt, L., Oschatz, M., Bryjak, M., Atchison, J. S., Keesman, K. J., Kaskel, S., Biesheuvel, P. M., and Presser, V., "Direct prediction of the desalination performance of porous carbon electrodes for capacitive deionization", *Energy Environ. Sci.*, 2013, 6, 3700.

Porada, S., Zhao, R., van der Wal, A., Presser, V., and Biesheuvel, "Review on the science and Technology of Water Desalination by Capacitive Deionization [OPEN ACCESS]". *Progress in Materials Science,* 2013, 58: 1388-1442.

Presser, Volker, Christopher R Dennison, Jonathan Campos, kevin w. Knehr, Emin c. Kumbur, and Yuri Gogotsi, *"The Electrochemical Flow Capacitor: A new Concept for rapid energy storage and recovery."* Advanced Energy Materials 2, #7 (2012): 895-902

Rommerrskirchen, A. et al *"Single Module Flow-Electrode Capacitive de ionization for Continuous Water de Salination"* Electrochemistry Communications (2015)

Simon P; Gogotsi Y; Nature Materials 2008, 7,845

Suss, M. E., Porada, S., Sun, X., Biesheuvel, P. M., Yoon, J., Presser, V., "Water De Salination via Capacitive de Ionization: what is it and what can we expect from it?" *Energy and Environmental Science.* 2015, 8,2296

Unda J E Z; Roduner E; *Physical Chemistry Chemical Physics* 2012, 14 3816

Weinstein, Lawrence, and Ranjan Dash, *Capacitive Deionization: Challenges and Opportunities. Desalination & Water Reuse*|November-December 2013

Yang, SeungCheol, Choi, Jiyeon, Yeo, Jeong-gu, Jeon, Sung-il, Park, Hong-ran and Kim, Dong Kook, "Flow-electrode capacitive deionization using an aqueous electrolyte with a high salt concentration." *Environ Sci Technol.* 2016 Jun. 7; 50(11):5892-9

Yang, SeungCheol, Jeon, Sung-il, Kim, Hanki, Choi, Jiyeon, Yeo, Jeong-gu, Park, Hong-ran, and Kim, Dong Kook, "Stack design and operation for scaling up the capacity of flow-electrode capacitive deionization technology." *ACS Sustainable Chemistry and Engineering,* 2016, 4 (8), pp 4174-4180.

Yuan, L., Yang, X., Liang, P., Wang, L., Huang, Z. H., Wei, J., Huang, X. 2012. "Capacitive deionization coupled with microbial fuel cells to desalinate low concentration salt water. *Bioresource Technology,* 110, 735-8.

Zhao, R; Biesheuvel P M; Miedema H; Brunning H; van der Wal A; "Charge efficiency: A functional tool to probe the double-layer structure inside of porous electrodes and application in the modeling of capacitive deionization", *The Journal of Physical Chemistry Letters* 2010, 1,205

Zou, L., Li, L., Song, H., Morris, G., "Using mesoporous carbon electrodes for brackish water desalination." *Water Research* 2008 April; 42(8-9):2340-8.

All references referred to herein are incorporated herein by reference as providing teachings known within the prior art. While the apparatus and methods of this invention have been described in terms of preferred embodiments, it will be apparent to those of skill in the art that variations may be applied to the process and system described herein without departing from the concept and scope of the invention. All such similar substitutes and modifications apparent to those skilled in the art are deemed to be within the scope and concept of the invention. Those skilled in the art will recognize that the method and apparatus of the present invention has many applications, and that the present invention is not limited to the representative examples disclosed herein. Moreover, the scope of the present invention covers conventionally known variations and modifications to the system components described herein, as would be known by those skilled in the art. While the apparatus and methods of this invention have been described in terms of preferred or illustrative embodiments, it will be apparent to those of skill in the art that variations may be applied to the process described herein without departing from the concept and scope of the invention. All such similar substitutes and modifications apparent to those skilled in the art are deemed to be within the scope and concept of the invention as it is set out in the following claims.

I claim:

1. A flow-electrode capacitive deionization (FCDI) desalination cell comprising:

a. a tubular housing having an upper end and a lower end, a first interior annular fluid flow space extending between the upper and lower ends, a feed solution inlet port proximate the lower end in fluid communication with the first interior annular fluid flow space, and a treated solution outlet port proximate the upper end in fluid communication with the first interior annular fliud flow space;

b. an tubular upper end cap attached to the tubular housing upper end and comprising an internal annular upper end cap space, an upper seal member sealing the upper end of the tubular housing, and an upper end cap outlet port in fluid communication with the internal annular upper end cap space, the upper seal member isolating the internal annular upper end cap space from the tubular housing first interior annular fluid flow space;

c. an tubular lower end cap attached to the tubular housing lower end and comprising an internal annular lower end cap space, a lower seal member sealing the lower end of the tubular housing, and a lower end cap inlet port in fluid communication with the internal annular lower end cap space, the lower seal member isolating the internal annular lower end cap space from the tubular housing first interior annular fluid space space;

d. a plurality of tubular membranes oriented in parallel relationship to each other, each tubular membrane having a lower end, an upper end, an outer surface and an inner tubular space therebetween, each tubular membrane being mounted within the cell so that the lower end of each tubular membrane is in fluid communication with the internal annular lower end cap space, so that the lower end of each tubular membrane passes in sealed fashion through the lower seal member, so that each tubular membrane extends through the first interior annular fluid flow space, so that the upper end of each tubular membrane passes in sealed fashion through the upper seal member, and so that the upper end of each tubular membrane is in fluid communication with the internal annular upper end cap space, each tubular member connecting the internal annular lower end cap space and the internal annular upper end cap space in fluid communication; and e. a plurality of electrodes extended through each respective tubular membrane inner tubular space, respectively, wherein approximately one half of the plurality of electrodes each has a positive polarity, wherein the remainder of the plurality of electrodes each has a negative polarity, and wherein the negative and positive polarity electrodes are evenly distributed through the plurality of electrodes to create a plurality of pairs of tubular membranes having opposite polarity;

wherein the internal annular lower end cap space is capable of receiving a carbon slurry through the lower end cap inlet port, wherein the carbon slurry is capable of moving through the inner tubular spaces of the plurality of tubular members into the internal annular upper end cap space and then out the upper end cap outlet port.

2. The FCDI desalination cell of claim 1 wherein the plurality of electrodes comprise titanium wire.

3. The FCDI desalination cell of claim 1 wherein the plurality of electrodes comprise graphite rod wire.

4. The FCDI desalination cell of claim 1 wherein the plurality of electrodes comprise electrode coils.

5. The FCDI desalination cell of claim 1 wherein the plurality of electrodes comprise electrode mesh.

6. The FCDI desalination cell of claim 1 wherein the plurality of tubular membranes are selected from the group consisting of ultra-fine (UF) filter tubes, cellulose ester membranes, tubular ionic membranes, porous and compressible PTFE and/or fluorocopolymers.

7. A flow-electrode capacitive deionization (FCDI) desalination system comprising:

a. an FCDI desalination cell comprising
  i. a tubular housing having an upper end and a lower end, a first interior annular fluid flow space extending between the upper and lower ends, a feed solution inlet port proximate the lower end in fluid communication with the first interior annular fluid flow space, and a treated solution outlet port proximate the upper end in fluid communication with the first interior annular fluid flow space;
  ii. an tubular upper end cap attached to the tubular housing upper end and comprising an internal annular upper end cap space, an upper seal member sealing the upper end of the tubular housing, and an upper end cap outlet port in fluid communication with the internal annular upper end cap space, the upper seal member isolating the internal annular upper end cap space from the tubular housing first interior annular fluid flow space;
  iii. an tubular lower end cap attached to the tubular housing lower end and comprising an internal annular lower end cap space, a lower seal member sealing the lower end of the tubular housing, and a lower end cap inlet port in fluid communication with the internal annular lower end cap space, the lower seal member isolating the internal annular lower end cap space from the tubular housing first interior annular fluid flow space;
  iv. a plurality of tubular membranes oriented in parallel relationship to each other, each tubular membrane having a lower end, an upper end, an outer surface and an inner tubular space therebetween, each tubular membrane being mounted within the cell so that the lower end of each tubular membrane is in fluid communication with the internal annular lower end cap space, so that the lower end of each tubular membrane passes in sealed fashion through the lower seal member, so that each tubular membrane extends through the first interior annular fluid flow space, so that the upper end of each tubular membrane passes in sealed fashion through the upper seal member, and so that the upper end of each tubular membrane is in fluid communication with the internal annular upper end cap space, each tubular member connecting the internal annular lower end cap space and the internal annular upper end cap space in fluid communication; and
  v. a plurality of electrodes extended through each respective tubular membrane inner tubular space, respectively, wherein approximately one half of the plurality of electrodes each has a positive polarity, wherein the remainder of the plurality of electrodes each has a negative polarity, and wherein the negative and positive polarity electrodes are evenly distributed through the plurality of electrodes to create a plurality of pairs of tubular membranes having opposite polarity;
    wherein the annular lower end cap space is capable of receiving a carbon slurry through the lower end cap inlet port, wherein the carbon slurry is capable of moving through the inner tubular spaces of the plurality of tubular members into the internal annular upper end cap space and then out the upper end cap outlet port;

b. a first motive force for introducing a feed solution, to be desalinated, through the feed solution inlet port and into the cell, at a first pressure $P_1$, and for urging the feed solution to move through the first interior annular fluid flow space while contacting the outer surfaces of the plurality of tubular membranes before exiting the cell through the treated solution outlet port;

c. a source of carbon slurry; and d. a second motive force for introducing the carbon slurry into the cell internal annular lower end cap space, at a second pressure $P_2$, through the lower end cap inlet, urging the carbon slurry to pass through the inner tubular spaces of the plurality of tubular membranes, into the internal annular upper end cap space and then out of the upper end cap outlet port.

8. The FCDI desalination cell of claim 7 wherein the plurality of electrodes comprise titanium wire.

9. The FCDI desalination cell of claim 7 wherein the plurality of electrodes comprise graphite rod wire.

10. The FCDI desalination cell of claim 7 wherein the plurality of electrodes comprise electrode coils.

11. The FCDI desalination cell of claim 7 wherein the plurality of electrodes comprise electrode mesh.

12. The FCDI desalination cell of claim 7 wherein the plurality of tubular membranes are selected from the group consisting of ultra-fine (UF) filter tubes, cellulose ester membranes, tubular ionic membranes, porous and compressible PTFE and/or fluorocopolymers.

13. The FCDI desalination system of claim 7 wherein the first motive force is a positive force created by a pump to push the feed solution through the cell.

14. The FCDI desalination system of claim 7 wherein the first motive force is a vacuum force to pull the feed solution through the cell.

15. The FCDI desalination system of claim 7 wherein the second motive force is a positive force created by a pump to push the carbon slurry through the cell.

16. The FCDI desalination system of claim 7 wherein the second motive force is a vacuum force to pull the carbon slurry solution through the cell.

17. The FCDI desalination system of claim 7 further comprising a reservoir for holding the carbon slurry, the reservoir being in fluid communication with the lower end cap inlet port, the reservoir capable of separating excess saline solution from the carbon slurry.

18. A method of flow-electrode capacitive deionization (FCDI) desalination of brine or brackish feed water solution comprising the steps of:
   a. introducing the brine or brackish feed water solution into an FCDI desalination cell, the cell comprising
      i. a tubular housing having an upper end and a lower end, a first interior annular fluid flow space extending between the upper and lower ends, a feed solution inlet port proximate the lower end in fluid communication with the first interior annular fluid flow space, and a treated solution outlet port proximate the upper end in fluid communication with the first interior annular fluid flow space;
      ii. an tubular upper end cap attached to the tubular housing upper end and comprising an internal annular upper end cap space, an upper seal member sealing the upper end of the tubular housing, and an upper end cap outlet port in fluid communication with the internal annular upper end cap space, the upper seal member isolating the internal annular upper end cap space from the tubular housing first interior annular fluid flow space;
      iii. an tubular lower end cap attached to the tubular housing lower end and comprising an internal annular lower end cap space, a lower seal member sealing the lower end of the tubular housing, and a lower end cap inlet port in fluid communication with the internal annular lower end cap space, the lower seal member isolating the internal annular lower end cap space from the tubular housing first interior annular space;
      iv. a plurality of tubular membranes oriented in parallel relationship to each other, each tubular membrane having a lower end, an upper end, an outer surface and an inner tubular space therebetween, each tubular membrane being mounted within the cell so that the lower end of each tubular membrane is in fluid communication with the internal annular lower end cap space, so that the lower end of each tubular membrane passes in sealed fashion through the lower seal member, so that each tubular membrane extends through the first interior annular fluid flow space, so that the upper end of each tubular membrane passes in sealed fashion through the upper seal member, and so that the upper end of each tubular membrane is in fluid communication with the internal annular upper end cap space, each tubular member connecting the internal annular lower end cap space and the internal annular upper end cap space in fluid communication; and
      v. a plurality of electrodes extended through each respective tubular membrane inner tubular space, respectively, wherein approximately one half of the plurality of electrodes each has a positive polarity, wherein the remainder of the plurality of electrodes each has a negative polarity, and wherein the negative and positive polarity electrodes are evenly distributed through the plurality of electrodes to create a plurality of pairs of tubular membranes having opposite polarity;
         wherein the internal annular lower end cap space is capable of receiving a carbon slurry through the lower end cap inlet port, wherein the carbon slurry is capable of moving through the inner tubular spaces of the plurality of tubular members into the internal annular upper end cap space and then out the upper end cap outlet port;
   b. pressurizing the feed water solution to a first pressure $P_1$;
   c. applying a positive polarity to the approximately one half of the plurality of electrodes designated to have a positive polarity;
   d. applying a negative polarity to the remaining approximately one half of the plurality of electrodes designated to have a negative polarity;
   e. introducing the carbon slurry into the cell internal annular lower end cap space, at a second pressure $P_2$, through the lower end cap inlet port, urging the carbon slurry to pass through the inner tubular spaces of the plurality of tubular members, into the internal annular upper end cap space and then out of the upper end cap outlet port; and
   f. directing the treated solution out the treated solution outlet port to a desired location.

19. The method of claim 18 further comprising the steps of adjusting the first and second pressure so that $P_1 > P_2$.

20. The method of claim 19 further comprising the steps of directing the carbon slurry from the upper end cap outlet port to a carbon slurry reservoir, and separating and removing any brine solution that may have accumulated in the carbon slurry prior to redirecting the carbon slurry back through the lower end cap inlet port.

* * * * *